United States Patent
Takenaka et al.

(10) Patent No.: US 6,292,505 B1
(45) Date of Patent: Sep. 18, 2001

(54) DUAL RESONATOR LASER APPARATUS WITH OPTICAL MODULATION

(75) Inventors: Yushi Takenaka; Jun-ichi Nishimae; Yukio Satoh, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/285,721

(22) Filed: Apr. 5, 1999

(30) Foreign Application Priority Data

Oct. 12, 1998 (JP) .................................................. 10-289271

(51) Int. Cl.[7] .................................................... H01S 3/082
(52) U.S. Cl. ............................ 372/97; 372/106; 372/27; 372/12
(58) Field of Search ............................... 372/106, 97, 98, 372/92

(56) References Cited

U.S. PATENT DOCUMENTS

| | | | |
|---|---|---|---|
| 4,176,327 | * 11/1979 | Wayne et al. | 331/94.5 |
| 4,809,285 | * 2/1989 | Scully | 372/69 |
| 5,027,365 | * 6/1991 | Anderson | 372/56 |
| 5,917,843 | * 6/1999 | Greene | 372/19 |

FOREIGN PATENT DOCUMENTS 10275950    10/1998   (JP) .

OTHER PUBLICATIONS

Excerpt from "Applied Optics", vol. 35, No. 27, Sep. 1996, p. 5383.

\* cited by examiner

*Primary Examiner*—Teresa M. Arroyo
*Assistant Examiner*—Davienne Monbleau
(74) *Attorney, Agent, or Firm*—Leydig, Voit & Mayer, Ltd.

(57) ABSTRACT

In a laser apparatus, when no voltage is applied to optical modulator, a first linearly polarized component of a laser beam which passes through a polarization control mirror causes a laser oscillation in a first laser resonator and a laser beam is output from a second reflecting mirror. When a pulsed voltage is applied to the optical modulator, a second linearly polarized component of the laser beam reflected by the polarization control mirror passes through the optical modulation means and causes a Q-switched laser oscillation in a second laser resonator. In this case, the first linearly polarized component passes through the polarization control mirror and is output from the second reflecting mirror. This technique makes it possible to combine a Q-switched laser apparatus with a non-Q-switched laser apparatus without causing the power of the laser beam to exceed a maximum allowable limit that an electrooptical modulator can handle.

14 Claims, 36 Drawing Sheets

↕ P POLARIZATION
∙∙ S POLARIZATION
↻ LASER BEAM CIRCULARLY POLARIZED IN A CLOCKWISE DIRECTION
↺ LASER BEAM CIRCULARLY POLARIZED IN A COUNTERCLOCKWISE DIRECTION

1 μS

TIME

TIME

TIME

- ↕ P POLARIZATION
- •• S POLARIZATION
- ↻ LASER BEAM CIRCULARLY POLARIZED IN A CLOCKWISE DIRECTION
- ↺ LASER BEAM CIRCULARLY POLARIZED IN A COUNTERCLOCKWISE DIRECTION

- ↕ P POLARIZATION
- •• S POLARIZATION
- ↻ LASER BEAM CIRCULARLY POLARIZED IN A CLOCKWISE DIRECTION
- ↺ LASER BEAM CIRCULARLY POLARIZED IN A COUNTERCLOCKWISE DIRECTION

DUAL RESONATOR LASER APPARATUS WITH OPTICAL MODULATION

BACKGROUND OF THE INVENTION

1. Field of the Invention

The present invention relates to a laser apparatus capable of outputting from a laser medium a laser beam with a high peak intensity and a small pulse width, a laser beam with a low peak intensity and a large pulse width, and a continuous laser beam respectively, as desired.

2. Description of the Related Art

FIG. 34 is a cross-sectional view illustrating a Q-switched $CO_2$ laser apparatus having functions equivalent to those obtained by a conventional Q-switched $CO_2$ laser apparatus described for example in FIG. 4 of the paper published in Applied Optics, Vol. 35, No. 27, Sep. 1996, p. 5383. As shown in FIG. 34, the conventional Q-switched $CO_2$ laser apparatus includes a total reflection mirror 1 in concave form, a partial reflection mirror 2 in concave form, Brewster windows 4a and 4b, a quarter-wave plate 5, a discharge tube 6, an electrooptical modulator 7, and a pulse generator 8.

In FIG. 34, the total reflection mirror 1 is a mirror formed of Cu in concave shape for example. The partial reflecting mirror 2 is a mirror which is formed of ZnSe in concave shape, for example, and which is disposed at a location opposite to the total reflection mirror 1. The partial reflection mirror 2 and the total reflection mirror 1 form a stable type laser resonator.

In FIG. 34, a laser beam 3 is generated in the laser resonator. Only a P polarization component of the generated laser beam can pass through the Brewster windows 4a and 4b, and an S polarization component thereof is reflected by them.

The electrooptical modulator 7 is made of, for example, CdTe. The pulse generator 8 generates3 a voltage signal whose amplitude periodically changes ir a binary fashion. The generated pulse voltage is applied to the electrooptical modulator 7. The laser beam is partially output, as denoted by reference numeral 9 in FIG. 34, to the outside of the laser apparatus through the partial reflection mirror 2.

The operation of the conventional Q-switched $CO_2$ laser apparatus in a Q-switched pulse mode is described below.

FIGS. 35 and 36 conceptually illustrate the operation of the conventional laser apparatus.

FIG. 37 illustrates a typical output characteristic of the conventional laser apparatus in the Q-switched operation mode.

First, the operation is described with reference to FIG. 35 for the case where no voltage is; applied from the pulse generator 8 to the electrooptical modulator 7.

In FIG. 35, only the P polarization component of the linearly polarized laser beam 3 can pass through the discharge tube 6 disposed between the Brewster windows 4a and 4b, so that the laser beam 3 becomes a beam circularly polarized in a counterclockwise direction after passing through the quarter-wave plate 5.

Because no voltage is applied to the electrooptical modulator 7, the laser beam 3 passes through the electrooptical modulator 7 while maintaining the circular polarization in the counterclockwise direction. After passing through the electrooptical modulator 7, the laser beam 3 is reflected by the total reflection mirror 1 and becomes a beam circularly polarized in a clockwise direction.

The laser beam 3 again passes through the electrooptical modulator 7 while maintaining the circular polarization in the clockwise direction, and further passes through the quarter-wave plate 5. As a result of passage through the quarter-wave plate 5, the laser beam becomes a linearly polarized beam comprising an S polarization component. However, the S polarization component of the laser beam cannot pass through the discharge tube disposed between the Brewster windows 4a and 4b. Therefore, no laser oscillation occurs when no voltage is applied to the electrooptical modulator 7.

Referring now to FIG. 36, the operation is described below for the case where a quarter-wave voltage is applied from the pulse generator 8 to the electrooptical modulator 7. Herein, the quarter-wave voltage refers to a voltage which causes the laser beam passing through the electrooptical modulator 7 to be modulated in phase by a quarter of the wavelength.

In this case, the laser beam 3 passes through the quarter-wave plate 5 and becomes a beam circularly polarized in a counterclockwise direction. The laser beam 3 circularly polarized in the counterclockwise direction then passes through the electrooptical modulator 7 and becomes a linearly polarized beam comprising an S polarization component. The laser beam 3 is then reflected by the total reflection mirror 1 and again passes through the electrooptical modulator 7. The laser beam 3 is changed into a beam circularly polarized in a clockwise direction during passing through the electrooptical modulator 7. The laser beam 3 further passes through the quarter-wave plate 5 and changes into a linearly polarized beam comprising a P polarization component. This laser beam 3 can pass through the discharge tube 6 disposed between the Brewster windows 4a and 4b and thus can reach the partial reflection mirror 2. Therefore, in this case, laser oscillation occurs in a Q-switched pulse mode.

As described above, a Q-switched laser beam 9 with a high peak intensity and a small pulse width can be output as shown in FIG. 37 by applying a periodically varying voltage in a binary fashion to the electrooptical modulator 7 from the pulse generator 8. This technique is generally called Q switching.

If the Q-switched laser beam 9 output from the pulse generator 8 is focused through a lens or the like, it is possible to obtain a laser beam with a high energy density, which can be used to efficiently make a hole in an object.

In the specific example shown in FIG. 37, each Q-switched pulse generated at a repetition frequency of 1 KHz has a peak power of 1.8 MW and a full width at half maximum power of 30 ns, and thus a laser energy of about 60 mJ is output per cycle.

The operation of the Q-switched $CO_2$ laser apparatus is described below for the case where a continuous laser beam is generated, or a laser beam with a low peak power and a large pulse width is generated.

FIG. 38 illustrates the operation of the conventional Q-switched $CO_2$ laser apparatus.

FIG. 39 illustrates a typical waveform obtained in a pulse-mode operation using the conventional laser apparatus.

As shown in FIG. 38, the laser resonator of the Q-switched $CO_2$ laser becomes equivalent to a conventional laser resonator with a simple structure comprising only a total reflection mirror 1 and a partial mirror 2. In this case, a quarter-wave voltage is applied from the pulse generator 8 to the electrooptical modulator 7 from the beginning before laser oscillation occurs.

Therefore, a laser beam 9 is output through the partial reflection mirror 2 in either a continuous oscilation mode or a pulse oscillation mode depending on whether continuous power or power in a pulse manner is applied to the discharge tube 6. The waveform of the pulse operated by pulse mode has a lower peak power and a greater pulse width than obtained in the Q-switched mode.

If the laser beam 9 output by means of Q-switched operation using the conventional Q-switched $CO_2$ laser apparatus is used in a laser machining process such as a hole making process, the peak power is too high to properly machine an object. The high peak power often causes damage to a part other than the object to be machined.

If the peak power is reduced to a level low enough to avoid the above problem, the laser energy of each pulse decreases by an amount corresponding to the reduction in the peak power and thus it becomes impossible to make a desired hole in the object.

One technique to solve the above mentioned problem is to combine a Q-switched laser apparatus with a non-Q-switched laser apparatus capable of generating a continuous laser beam or a laser beam in the form of a pulse. In this case, although it becomes possible to machine a variety of objects in a desired fashion, another problem occurs in the laser apparatus itself.

The average output power in the non-Q-switched continuous or pulse operation is 10 to 20 times greater than that obtained in the Q-switched operation. This means that, in the non-Q-switched operation, a laser beam with very high power always passes through the electrooptical modulator 7.

For example, in the Q-switched operation, if the repetition frequency is set to 1 kHz, then the peak power becomes 1.8 MW and the full-width at half maximum becomes 30 ns. Furthermore, if the laser beam output energy per cycle is 60 mJ, then the average output power becomes 60 W. If it is assumed that the average output power in the non-Q-switched continuous or pulse mode is 10 times that in the Q-switched mode, then the average output power in the non-Q-switched continuous or pulse mode becomes 600 W.

In most cases, the electrooptical modulator 7 used in the Q-switched $CO_2$ laser apparatus is made of CdTe. However, the maximum laser beam power that the electrooptical modulator made of CdTe can handle is determined by the characteristics of CdTe and is as low as about 60 W. Therefore, if the laser beam with an average power of 600 w is generated in the non-Q-switched continuous or pulse mode and is passed through CdTe, the average power exceeds the maximum allowable power of CdTe. For the above reason, when a laser apparatus which operates in the Q-switched mode and a laser apparatus which operates in the non-Q-switched continuous or pulse mode aire combined together, although the system can operate normally for a some duration after the system is started, the electrooptical modulator 7 is broken or the operation becomes unstable after a while, and thus it becomes difficult to perform a laser machining process.

SUMMARY OF THE INVENTION

In view of the above, it is an object of the present invention to provide a laser apparatus capable of outputting a laser beam in any desired mode selected from the group comprising a mode for generating a laser beam with a high intensity and a small pulse width, a mode for generating a laser beam with a low intensity and a large pulse width, and a mode for generating a continuous laser beam. It is another object of the invention to provide a multistage amplification laser apparatus and a laser machining apparatus using such a laser apparatus.

According to an aspect of the present invention, there is provided a laser apparatus including two laser resonators having one laser medium, and polarization control means for switching the oscillating optical axes of the two laser resonators.

In one form of the present invention, the laser apparatus further comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam reflected by the polarization control element for forming a second laser resonator in cooperation with the first reflecting mirror, optical modulation means disposed between the polarization control element and the third reflecting mirror for modulating the phase of the laser beam depending on a voltage applied thereto, and a first optical guiding element for converting the first linearly polarized component of the laser beam, which passed through the optical modulation means and the polarization control element successively, into a second linearly polarized component of the laser beam and then reflecting it toward the polarization control element, wherein when no voltage is applied to the optical modulation means, the first linearly polarized component of the laser beam which passes through the polarization control element causes a laser oscillation in the first laser resonator so that a laser beam is output from the second reflecting mirror, however, when a pulse voltage is applied to the optical modulation means, the second linearly polarized component of the laser beam reflected by the polarization control element passes through the optical modulation means and causes e, Q-switched laser oscillation in the second laser resonator, and the first linearly polarized component which has passed through the polarization control element is reflected by the first optical guiding element, modulated into a second linearly polarized component and further reflected by the polarization control element whereby a Q-switched pulse laser beam is output from the second reflecting mirror.

In another form of the present invention, the laser apparatus comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam transmitted through the polarization control element for forming a second laser resonator in cooperation with the first reflecting mirror, optical modulation means disposed between the polarization control element and the third reflecting mirror for modulating the phase of the laser beam depending on a voltage applied thereto, and a second optical guiding element for converting the second linearly polarized component of the laser beam, which passed through the optical modulation means and reflected by the polarization control element into a first linearly polarized component of the laser beam and then reflecting it toward the polarization control element wherein when no voltage is applied to the optical modulation means, the second linearly polarized component of the laser beam reflected by the polarization control element causes a laser oscillation in the first laser resonator so that a laser beam is output from the second reflecting mirror, however, when a pulse voltage is applied to the optical modulation means, the first linearly polarized component of the laser beam which passes through the polarization control element passes through the optical modulation means and causes a Q-switched laser oscillation in the second laser resonator, and the second linearly polarized component reflected by the polarization control element is reflected by the second optical guiding element, modulated into a first linearly polarized component and further passes through the polarization control element whereby a Q-switched pulse laser beam is output from the second reflecting mirror.

In a further form of the present invention, the laser apparatus comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a partial reflection mirror disposed on the optical axis of the laser beam reflected by the polarization control element for forming a second laser resonator in cooperation with the first reflecting mirror, and optical modulation means disposed between the polarization control element and the partial reflection mirror for modulating the phase of the laser beam depending on a voltage applied thereto, wherein when no voltage is applied to the optical modulation means, the first linearly polarized component of the laser beam which passes through the polarization control element causes a laser oscillation in the first laser resonator so that a laser beam is output from the second reflecting mirror, however, when a pulse voltage is applied to the optical modulation means, the second linearly polarized component of the laser beam reflected by the polarization control element passes through the optical modulation means and causes a Q-switched laser oscillation in the second laser resonator whereby a Q-switched pulse laser beam is output through the partial reflection mirror.

In a still further form of the present invention, the laser apparatus comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam reflected by the polarization control element for forming a second laser resonator in cooperation with the first reflecting mirror, and optical modulation means disposed between the polarization control element and the third reflecting mirror for modulating the phase of the laser beam depending on a voltage applied thereto, wherein when no voltage is applied to the optical modulation means, the first linearly polarized component of the laser beam which passes through the polarization control element causes a laser oscillation in the first laser resonator so that a laser beam is output from the second reflecting mirror, however, when a pulse voltage is applied to the optical modulation means, the second linearly polarized component of the laser beam reflected by the polarization control element passes through the optical modulation means and causes a Q-switched laser oscillation in the second laser resonator, and the first linearly polarized component passes through the polarization control element whereby a Q-switched pulse laser beam is output through the polarization control element.

In a yet further form of the present invention, the laser apparatus comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a partial reflection mirror disposed on the optical axis of the laser beam transmitted through the polarization control element for forming a second laser resonator in cooperation with the first reflecting mirror, and optical modulation means disposed between the polarization control element and the partial reflection mirror for modulating the phase of the laser beam depending on a voltage applied thereto, wherein when no voltage is applied to the optical modulation means, the second linearly polarized component of the laser beam reflected by the polarization control element causes a laser oscillation in the first laser resonator so that a laser beam is output from the second reflecting mirror, however, when a pulse voltage is applied to the optical modulation means, the first linearly polarized component of the laser beam transmitted through the polarization control element passes through the optical modulation means and causes a Q-switched laser oscillation in the second laser resonator whereby a Q-switched pulse laser beam is output through the partial reflection mirror.

In a further form of the present invention, the laser apparatus comprises a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam transmitted through the polarization control element for forming a second laser resonator with the first reflecting mirror, and optical modulation means disposed between the polarization control element and the third reflecting mirror for modulating the phase of the laser beam depending on a voltage applied thereto, wherein when no voltage is applied to the optical modulation means, the second linearly polarized component of the laser beam which is reflected by the polarization control element causes a laser oscillation in the first laser resonator so that a laser beam is output from the second reflecting mirror, however, when a pulse voltage is applied to the optical modulation means, the first linearly polarized component of the laser beam transmitted through the polarization control element passes through the optical modulation means and causes a Q-switched laser oscillation in the second laser resonator, and the second linearly polarized component is reflected by the polarization control element whereby a Q-switched pulse laser beam is output through the polarization control element.

The laser apparatus may further comprise an optical element for outputting two types of laser beams through the same single output port, wherein two types of laser beams include a laser beam which is output from the second reflecting mirror when no voltage is applied to the optical modulation means and a laser beam which is output through the partial reflection mirror when the pulse voltage is applied to the optical modulation means.

The laser apparatus may further comprise an optical element for outputting two types of laser beams through the same single output port, wherein two types of laser beams include a laser beam which is output from the second reflecting mirror when no voltage is applied to the optical modulation means and a laser beam which is output through the polarization control element when the pulse voltage is applied to the optical modulation means.

Preferably, the first reflecting mirror is a total reflection mirror and the second reflecting mirror is a partial reflection mirror.

Preferably, the optical modulation means comprises an electrooptical modulator and a wave plate.

The optical modulation means may be made up of an electrooptical modulator.

Preferably, the above-described pulse voltage applied to the optical modulation means varies according to a periodic function of time wherein the voltage varies at least twice or more times during each cycle.

The pulse voltage applied to the optical modulation means may vary according to a multi-level step function which is periodic with respect to time.

Preferably, an opening for selecting a transverse mode of the laser beam is provided in each of the first laser resonator and second laser resonator.

According to another aspect of the invention, there is provided a multistage amplification laser apparatus comprising a laser apparatus as described above and serving as a laser beam oscilation stage, and laser beam amplification stage means for amplifying a laser beam supplied from the laser beam oscilation stage.

In the multistage amplification laser apparatus, the laser beam amplification stage means may comprise a plurality of laser beam amplification stages.

According to still another aspect of the invention, there is provided a laser machining apparatus for machining an object by irradiating the object with a laser beam, wherein the laser machining apparatus includes a laser apparatus as described above.

DESCRIPTION OF THE PREFERRED EMBODIMENTS

Preferred embodiments of the present invention will now be described in detail while referring to the accompanying drawings.

First Embodiment

In a first embodiment, the invention is applied to a gas laser apparatus, in particular to a $CO_2$ laser apparatus, in which excitation is performed by means of discharging.

Figure 1:
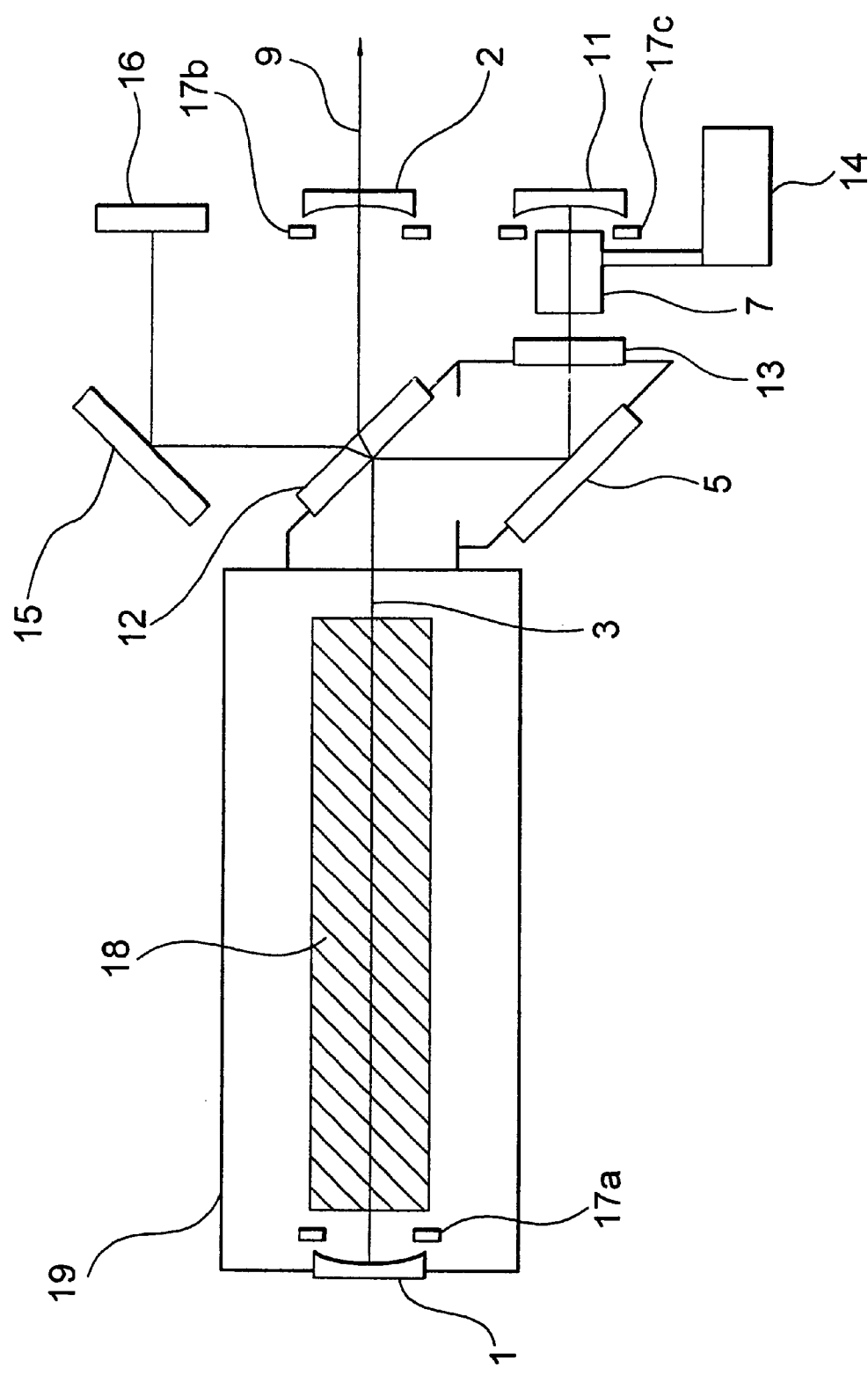
FIG. 1 is a cross-sectional view illustrating the construction of a laser apparatus according to a first embodiment of the invention.

FIG. 1 is a cross-sectional view illustrating the structure of a laser apparatus according to the first embodiment of the present invention.

FIGS. 2 to 7 are schematic diagrams illustrating the operation of the laser apparatus according to the first embodiment of the invention.

As shown in FIG. 1, the laser apparatus serving as a laser generator includes a total reflection mirror 11 serving as a third reflecting mirror, a polarization control mirror 12 serving as a polarizing optical element, a transmission window 13, a variable pulse generator 14, a reflection type quarter-wave plate 15, a flat or plane-shaped total reflection mirror 16 made of for example Cu openings 17a, 17b, and 17c, a laser medium 18, and an enclosure 19. In this embodiment, the quarter-wave plate 15 and the total reflection mirror 16 serve as a first optical guiding element by which a laser beam comprising a P polarization component, having successively passed through the electrooptical modulator 7 and the polarization control mirror 12, is converted into a laser beam comprising an S polarization component and then reflected toward the polarization control mirror 12.

A total reflection mirror 1 serves as a first reflecting mirror, and a partial reflection mirror 2 serves as a second reflecting mirror. A quarter-wave plate 5 and an electrooptical modulator 7 constitute an electrooptical modulation means. In particular, the electrooptical modulator 7 serves as an optical modulator and the quarter-wave plate serves as a wave plate.

In this structure, the total reflection mirror 1 and the partial reflection mirror 2 constitute a first laser resonator, and the total reflection mirror 1 and the total reflection mirror constitute a second laser resonator.

The openings 17a, 17b, and 17c serving as means for selecting the transverse mode of the laser beam are disposed in the first or second laser resonator.

Figure 34:
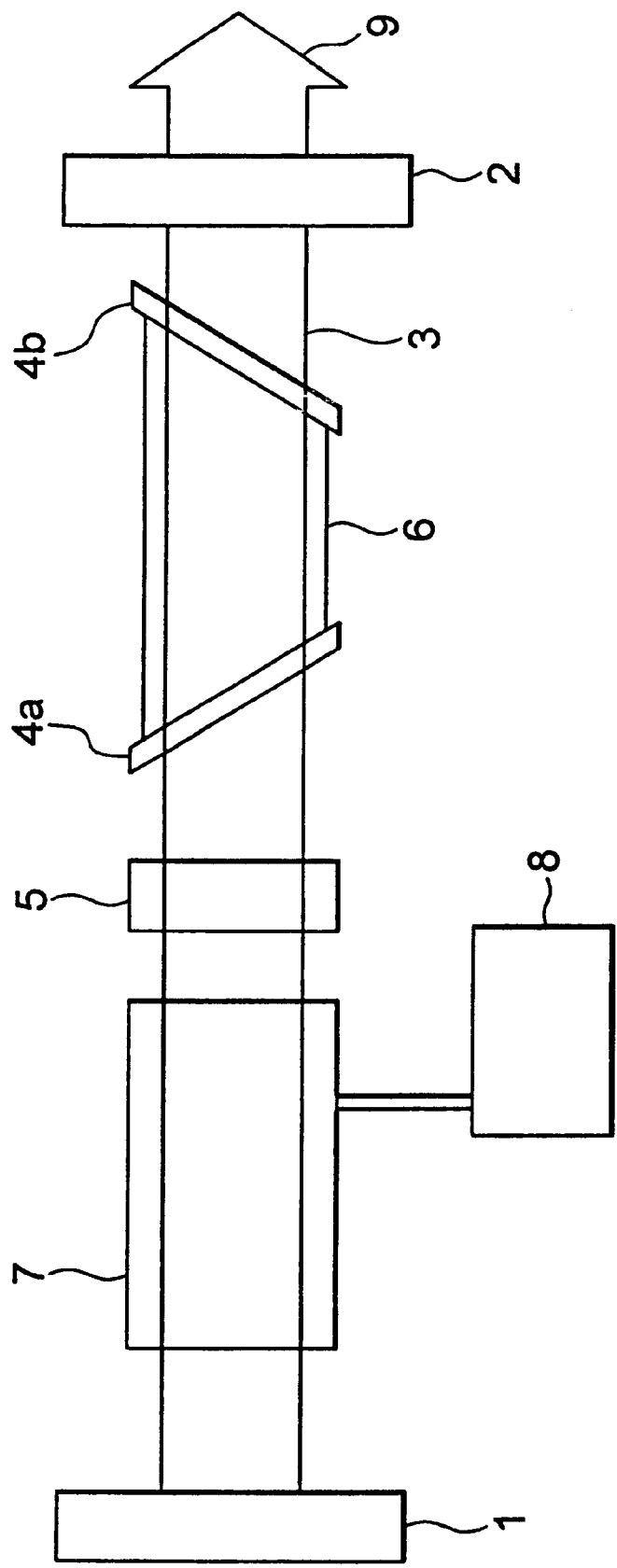
FIG. 34 is a cross-sectional view illustrating a Q-switched $CO_2$ laser apparatus having functions equivalent to those obtained by a conventional Q-switched $CO_2$ laser apparatus described for example in FIG. 4 of the paper published in Applied Optics, Vol. 35, No. 27, Sep. 1996, p. 5383.
Figure 35:
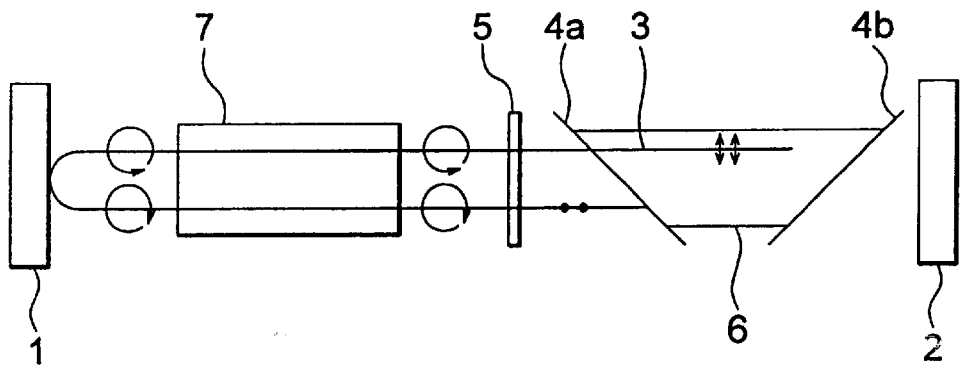
FIG. 35 is a schematic diagram conceptually illustrating the operation of the conventional laser apparatus, FIG. 36 a schematic diagram conceptually illustrating the operation of the conventional laser apparatus.
Figure 36:
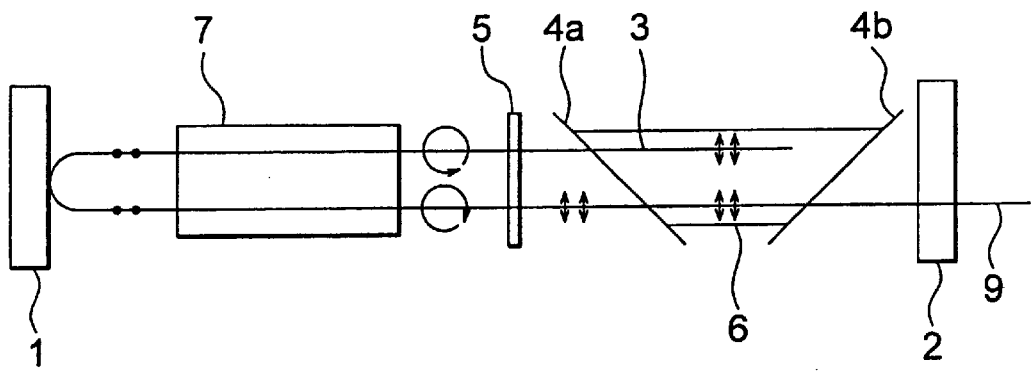

Those parts of this embodiment which are the same as or similar to those in the conventional laser apparatus (shown in FIG. 34) are denoted by the same reference numerals and they are not described in further detail here.

The total reflection mirror 11 is disposed at an angle different from that of the partial reflection mirror 2 so that a Q-switched laser resonator (second laser resonator) is formed by the total reflection mirror 11 and the total reflection mirror 1. The total reflection mirror 11 is formed of, for example, Cu in the form of concave mirror. The polarization control mirror 12 is disposed on both the optical axis of the total reflection mirror 1 and the optical axis of the partial reflection mirror 2 only a first linearly polarized component, that is a P polarization component, of the laser beam 3 is allowed to pass through the polarization control mirror 12 and a second linearly polarized component, that is an S polarization component, is reflected by the polarization control mirror 12.

The transmission window 13 serves to isolate the gas medium filling the enclosure 19 from the atmosphere while the laser beam 3 is allowed to pass through the transmission window 13 toward the total reflection mirror 11. The variable pulse generator 14 is a power supply for generating a voltage varying periodically over time, which is applied to the electrooptical modulator 7. The quarter-wave plate 15 and the total reflection mirror 16 converts the polarization of the Q-switched pulse laser beam 3 having passed through the polarization control mirror 12 from the P polarization to the S polarization and then conducts the resultant laser beam to the partial reflection mirror 2.

Herein, the laser apparatus is assumed to be a gas laser apparatus such as a $CO_2$ laser apparatus employing a gas medium which is in an excited state by means of discharging or the like in part of the laser medium filling the enclosure 19. Here, it is to be noted that the laser medium 18 symbolically indicates those portions of the gas medium which are locally excited to a high energy level.

The operation of this embodiment will be described below.

First, the operation is described for the case where no voltage is applied from the variable pulse generator to the electrooptical modulator 7.

Figure 2:
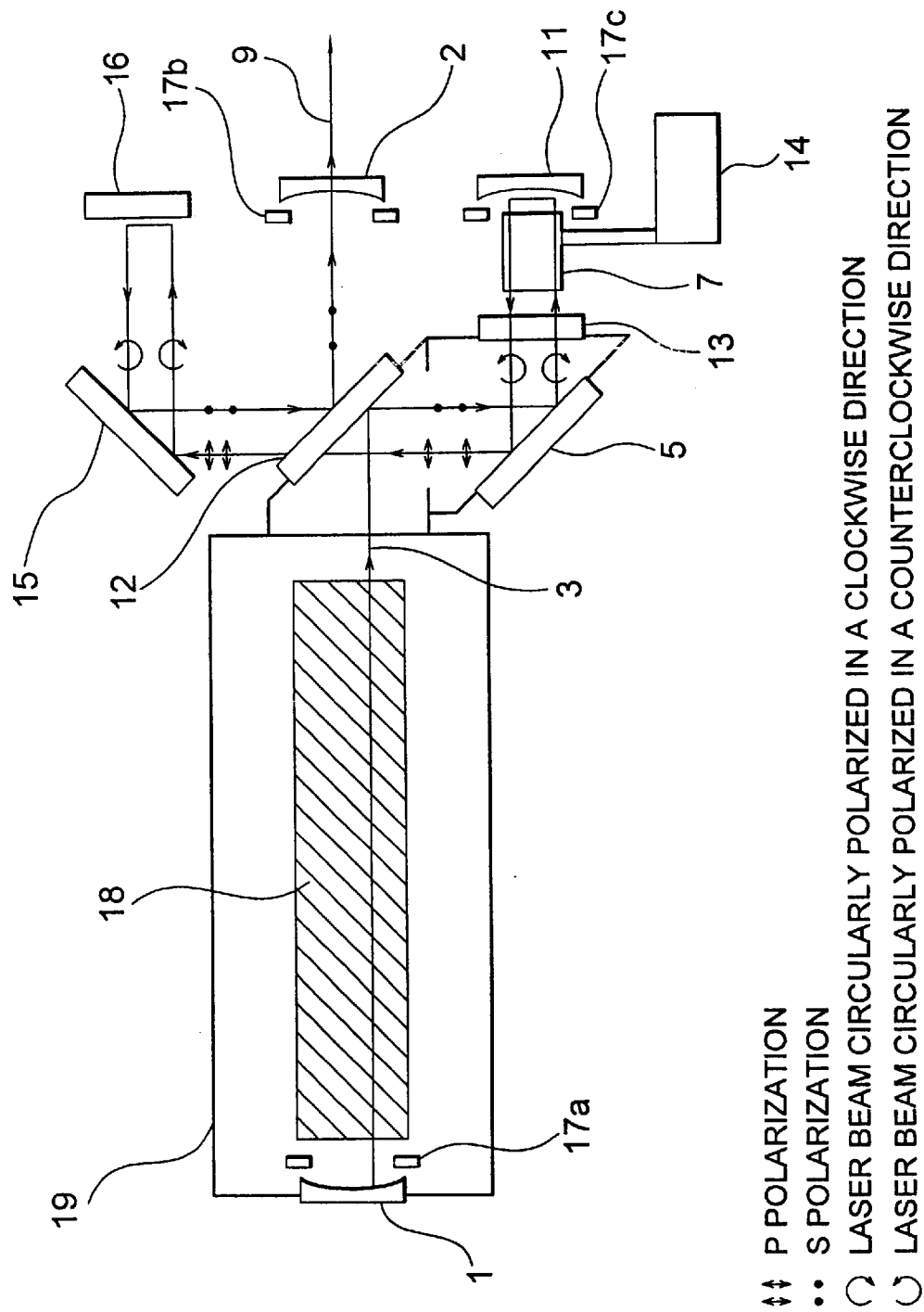
FIG. 2 is a schematic diagram illustrating the operation of the laser apparatus according to the first embodiment of the invention.

After being reflected by the total reflection mirror 1, the laser beam travels along one of two optical paths depending on whether the laser beam passes through the polarization control mirror 12 (refer to FIG. 3) or is reflected by the polarization control mirror 12 (refer to FIG. 2). These two optical paths are described in further detail below.

Referring to FIG. 2, the S polarization component of the laser beam 3 reflected by the total reflection mirror 1 is reflected by the polarization control mirror 12 to the quarter-wave plate 5. The laser beam 3 is then reflected by the quarter-wave plate 5 and becomes a laser beam circularly polarized in a clockwise direction.

In this case, because no voltage is applied to the electrooptical modulator 7, the laser beam 3 passes through both the transmission window 13 and the electrooptical modulator 7 while maintaining the circular polarization in the clockwise direction. After that, the laser beam 3 is reflected by the total reflection mirror 11. The reflection by the total reflection mirror causes the laser beam 3 to change to a beam circularly polarized in a counterclockwise direction. The laser beam 3 again passes through the electrooptical modulator 7 and the transmission window 13 and is again reflected by the quarter-wave plate 5. The reflection by the quarter-wave plate 5 causes the laser beam 3 to become a linearly polarized beam comprising a P polarization component.

The laser beam 3 comprising the P polarization component passes through the polarization control mirror 12 and is reflected by the quarter-wave plate 15. The reflection by the quarter-wave plate 15 causes the laser beam 3 to become a beam circularly polarized in a clockwise direction. The laser beam 3 is then reflected by the total reflection mirror 16 and becomes a beam circularly polarized in a counterclockwise direction. The laser beam 3 circularly polarized in the counterclockwise direction is again reflected by the quarter-wave plate 15 and becomes a linearly polarized beam comprising an S polarization component. The laser beam 3 is then reflected by the polarization control mirror 12 toward the partial reflection mirror 2. As a result, the S polarization component of the laser beam 3 which is reflected by the polarization control mirror 12 is reflected by the partial reflection mirror 2 by an amount determined by the reflectivity of the partial reflection mirror 2 and returns to the total reflection mirror 1.

Figure 3:
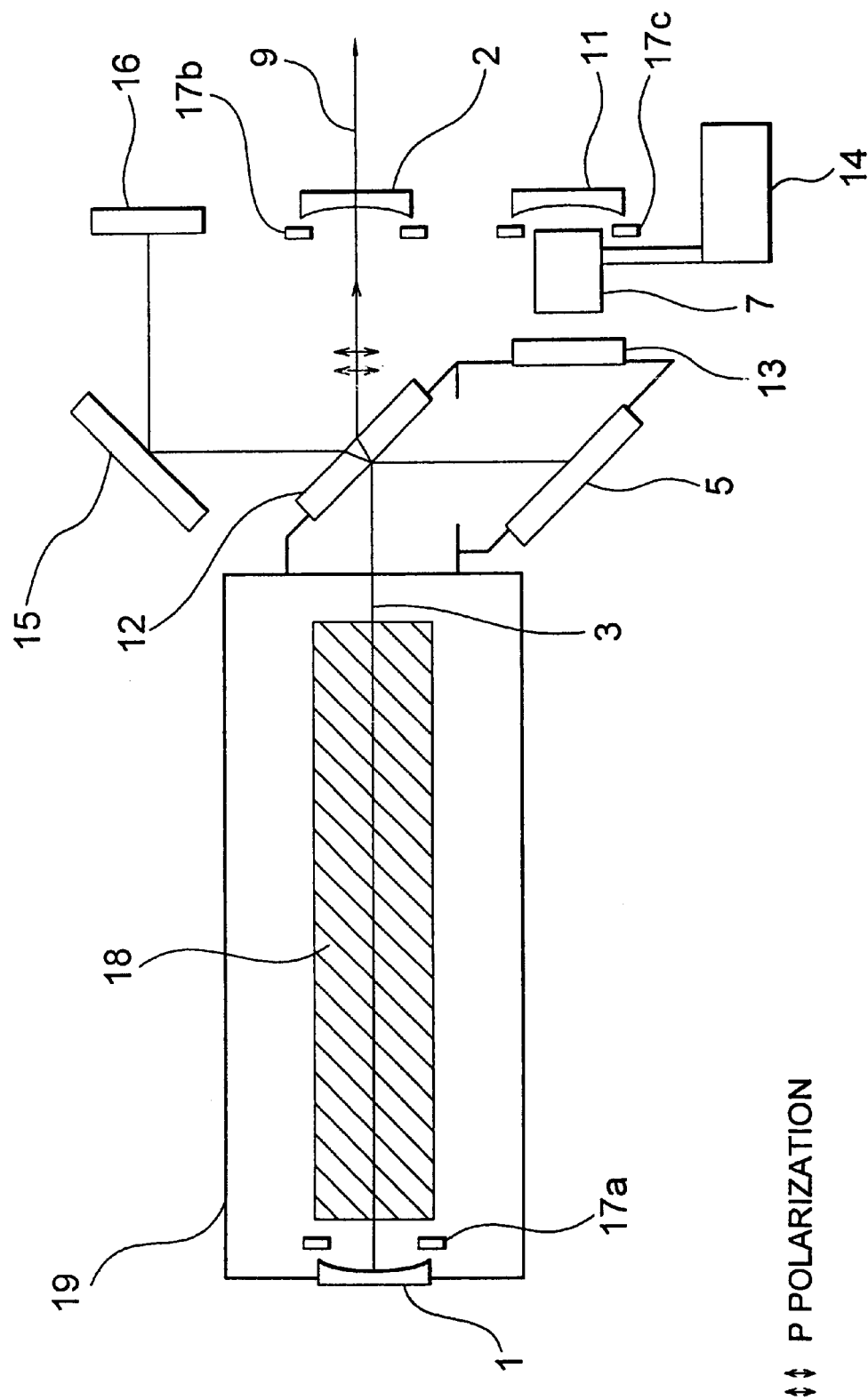
FIG. 3 is a schematic diagram illustrating the operation of the laser apparatus according to the first embodiment of the invention.

On the other hand, as shown in FIG. 3, the P polarization component of the laser beam reflected by the total reflection mirror 1 passes through the polarization control mirror 12 and directly reaches the partial reflection mirror 2 without traveling along the path shown in FIG. 2 for the S polarization component of the laser beam 3. That is, the P polarization component of the laser beam 3 passing through the polarization control mirror 12 is reflected by the partial reflection mirror 2 by an amount determined by the reflectivity of the partial reflection mirror 2 and returns to the total reflection mirror 1.

The Q factor of the laser resonator, that is the intensity of the laser beam 3 finally reflected by the partial reflection mirror 2 toward the total reflection mirror 2, is determined by the reflectivity of the partial reflection mirror 2. When no voltage is applied to the electrooptical modulator 7, both the S polarization component of the laser beam 3 which travels along the path (shown in FIG. 2) in which the laser beam falling, after being reflected by the total reflection mirror 1, on the polarization control mirror 12 is reflected by the polarization control mirror 12 and the P polarization component of the laser beam 3 which travels along the path (shown in FIG. 3) in which the laser beam falling, after being reflected by the total reflection mirror 1, on the polarization control mirror 12, passes through the polarization control mirror 12 are finally reflected by the same partial reflection mirror 2 and return to the total reflection mirror 1. That is, both the S and P polarization components of the laser beam 3 are reflected by the mirror having the same reflectivity.

Now it is discussed what determines which optical path causes a laser oscillation when no voltage is applied to the electrooptical modulator 7.

In general, optical elements forming a laser resonator have a reflection loss or a transmission loss and there are no optical elements which have an ideal reflectivity of 100% or an ideal transmittance of 100%. Therefore, the loss of the laser beam increases with the number of optical elements that the laser beam meets during the travel in the laser resonator.

The optical path of the P polarization component of the laser beam 3 shown in FIG. 3 includes only one optical element, that is, the polarization control mirror 12, between the total reflection mirror 1 and the partial reflection mirror 2. In contrast, the optical path of the S polarization component of the laser beam 3 shown in FIG. 3 includes, between the total reflection mirror 1 and the partial reflection mirror 2, three polarization control mirrors 12, two quarter-wave plates 5, two transmission windows 13, two electrooptical modulators 7, one total reflection mirror 11, two quarter-wave plates 15, and one total reflection mirror 16. That is, there are thirteen optical elements in total in this optical path.

Here, if it is assumed that each optical element has a loss of 0.5%, the P polarization component of the laser beam 3 which passes through the polarization control mirror 12 encounters a loss as small as 1% each time it travels along the full path in the laser resonator wherein the effects of the total reflection mirror 1 and the partial reflection mirror 2 are neglected. In contrast, the S polarization component of the laser beam 3 which is reflected by the polarization control mirror 12 encounters a loss as large as 12% each time it travels along the full path in the laser resonator.

As can be understood from the above description, when no voltage is applied from the variable pulse generator 14 to the electrooptical modulator 7, laser oscillation occurs in the optical path shown in FIG. 3 for the P polarization component of the laser beam 3 which passes through the polarization control mirror 12 and the laser beam 3 never travels along the optical path shown in FIG. 2 in the practical operation.

That is, in the case where no voltage is applied to the electrooptical modulator 7, the laser beam 3 never passes through the electrooptical modulator 7 and a high-power laser beam can be generated in a non-Q-switched continuous mode or a pulse mode.

Therefore, even if the maximum allowable laser output power that the electrooptical modulator 7 can handle is as low as for example 60 W, it is possible to generate a laser beam with average output power as high as for example 600 w in a continuous or pulse mode regardless of the allowable operation range of the electrooptical modulator 7 because the laser beam does not pass through the electrooptical modulator 7.

Figure 4:
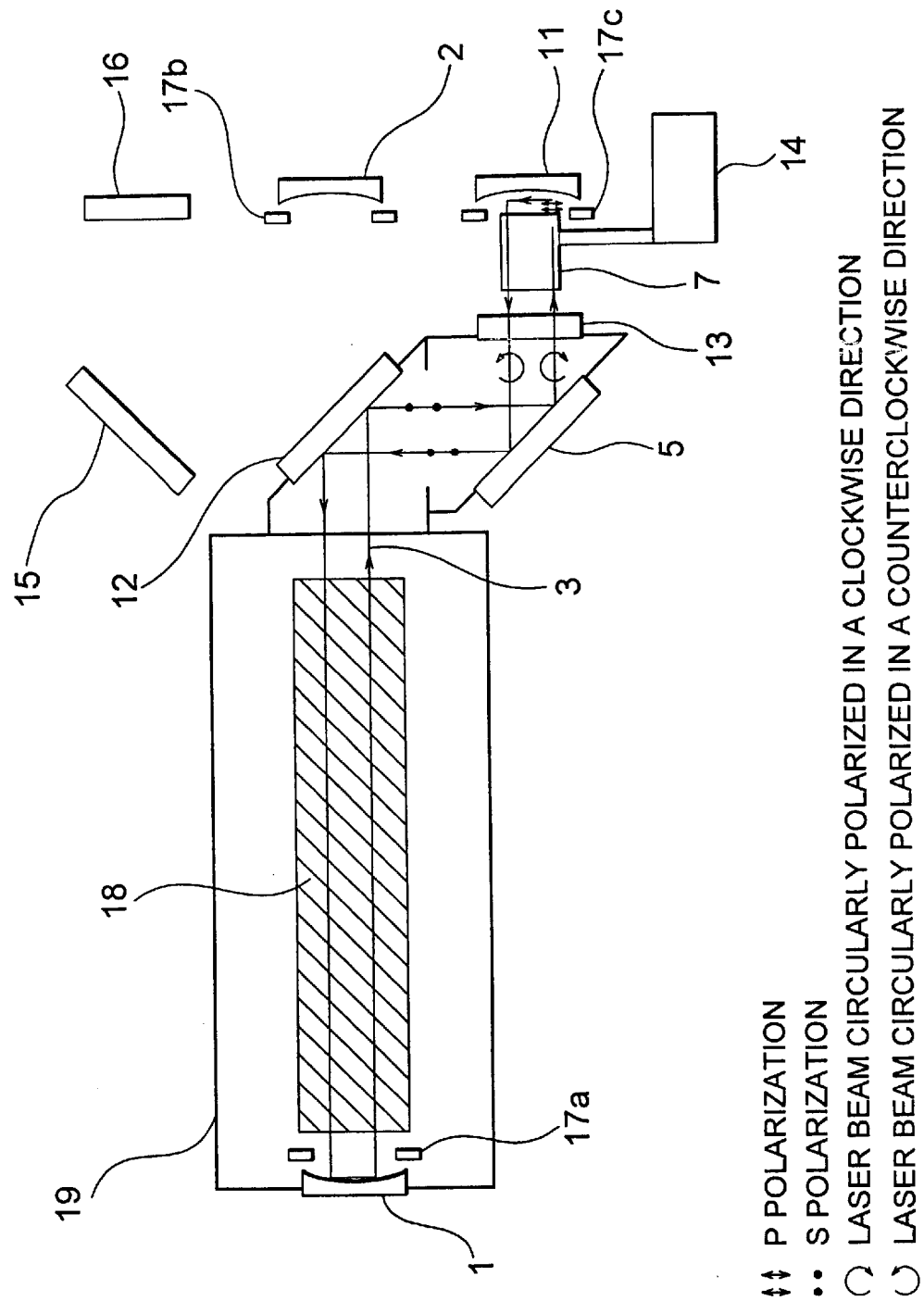
FIG. 4 is a schematic diagram illustrating the operation of the laser apparatus according to the first embodiment of the invention.

Referring now to FIG. 4, the operation is described below for the case where a quarter-wave voltage is applied from the variable pulse generator 14 to the electrooptical modulator 7.

In FIG. 4, the S polarization component of the laser beam 3 reflected by the polarization control mirror 12 is further reflected by the quarter-wave plate 5 and becomes a laser beam circularly polarized in a clockwise direction. When this laser beam passes through the transmission window 13 and the electrooptical modulator 7, it is converted to a linearly polarized laser beam comprising a P polarization component.

The laser beam 3 is then reflected by the total reflection mirror 11 and again passes through the electrooptical modulator 7 and the transmission window 13 and becomes a laser beam circularly polarized in a counterclockwise direction. The laser beam 3 is again reflected by the quarter-wave plate 5 and becomes a linearly polarized laser beam comprising an S polarization component. This laser beam 3 comprising the S polarization component cannot pass through the polarization control mirror 12 and thus it is all reflected by the polarization control mirror 12 toward the total reflection mirror 1. Thus the S polarization component of the laser beam 3 all returns to the total reflection mirror 1 after the travel along the optical path including the electrooptical modulator 7 and the total reflection mirror 11.

Therefore, in the case where the quarter-wave voltage is applied from the variable pulse generator 14 to the electrooptical modulator 7, the laser beam 3 is all confined within the laser resonator.

As a result, when the quarter-wave voltage is applied to the electrooptical modulator 7, the laser beam 3 does not reach the partial reflection mirror 2 and thus no laser oscillation occurs.

That is, by applying the quarter-wave voltage from the variable pulse generator 14 to the electrooptical modulator 7, it is possible to obtain an effective reflectivity of 100% at the partial reflection mirror thereby confining the laser beam within the laser resonator so that no laser oscillation occurs.

However, the situation described above is an ideal case in which the quarter-wave voltage is applied to the electrooptical modulator 7 so that the laser beam 3 is perfectly confined as shown in FIG. 4.

That is, when a pulse with an arbitrary voltage within the range from 0 to the quarter-wave voltage is applied to the electrooptical modulator 7, the laser beam 3, which is reflected by the total reflection mirror 11, passes the electrooptical modulator 7, and then is reflected by the quarter-wave plate 5, includes not only an S polarization component but also a P polarization component.

Although the S polarization component is reflected by the polarization control mirror 12 and thus it is confined within the laser resonator as shown in FIG. 4, the P polarization component passes through the polarization control mirror 12 and thus it travels along the optical path shown in FIG. 2 and goes out of the laser apparatus through the partial reflection mirror 2.

It can be concluded from the above discussion that it is possible to control the reflectivity of the partial reflection mirror 2 within the range from the intrinsic reflectivity of the partial reflection mirror to 100% by controlling the voltage, which is applied from the variable pulse generator 14 to the electrooptical modulator 7, within the range from 0 to the quarter-wave voltage.

That is, if the pulse voltage applied to the electrooptical modulator 7 is increased from 0 to the quarter-wave voltage, the Q factor of the laser resonator for the S polarization component of the laser beam 3 reflected by the polarization control mirror 12 becomes greater than that for the P polarization component of the laser beam 3 which passes through the polarization control mirror 12, and thus the laser oscillation optical path is switched.

As described above, when the laser medium is excited by input power lower than required to obtain laser oscillation in the optical path shown in FIG. 2, if the voltage is applied from the variable pulse generator 14 to the electrooptical modulator 7, then the optical path on which laser oscillation occurs is switched (from the optical path shown in FIG. 3 to the optical path shown in FIG. 2) and Q-switched laser oscillation occurs on the optical axis of the partial reflection mirror 2 in the optical path shown in FIG. 2.

In this structure, because the optical axis of the Q-switched laser beam output from the laser apparatus is on the optical of the partial reflection mirror 2, it is possible to output a laser beam from the laser apparatus through the same output port in both modes: the Q-switched mode (in which laser oscillation occurs along the optical path shown in FIG. 2), and non Q-switched continuous or pulse laser mode (in which laser oscillation occurs along the optical path shown in FIG. 3).

According to the present invention, it is possible to form the laser resonator in which laser oscillation occurs in the Q-switched mode and the laser resonator in which laser oscillation occurs in the non-Q-switched continuous or pulse mode in such a manner that they are independent of each other and thus it is possible to design the laser apparatus under the assumption that the electrooptical modulator 7 is required to handle the average power of the Q-switched pulse laser beam.

Furthermore, the laser apparatus includes only one laser medium as in the conventional laser apparatus and the laser beam 9 is output from the laser apparatus through the single output port. This makes it possible to achieve a laser apparatus with a very small size.

That is, it is possible to realize a laser apparatus having the capability, which cannot be achieved by the conventional technique, of operating in both the Q-switched mode and the non-Q-switched continuous or pulse mode. With this laser apparatus, it is possible to perform a laser machining process in a very efficient fashion by properly combining the Q-switched and non-Q-switched continuous or pulse operations.

Although the quarter-wave plate 5 is used in the first embodiment described above, the present invention is not limited to this. Any other proper types of wave plates may also be employed.

Figure 5:
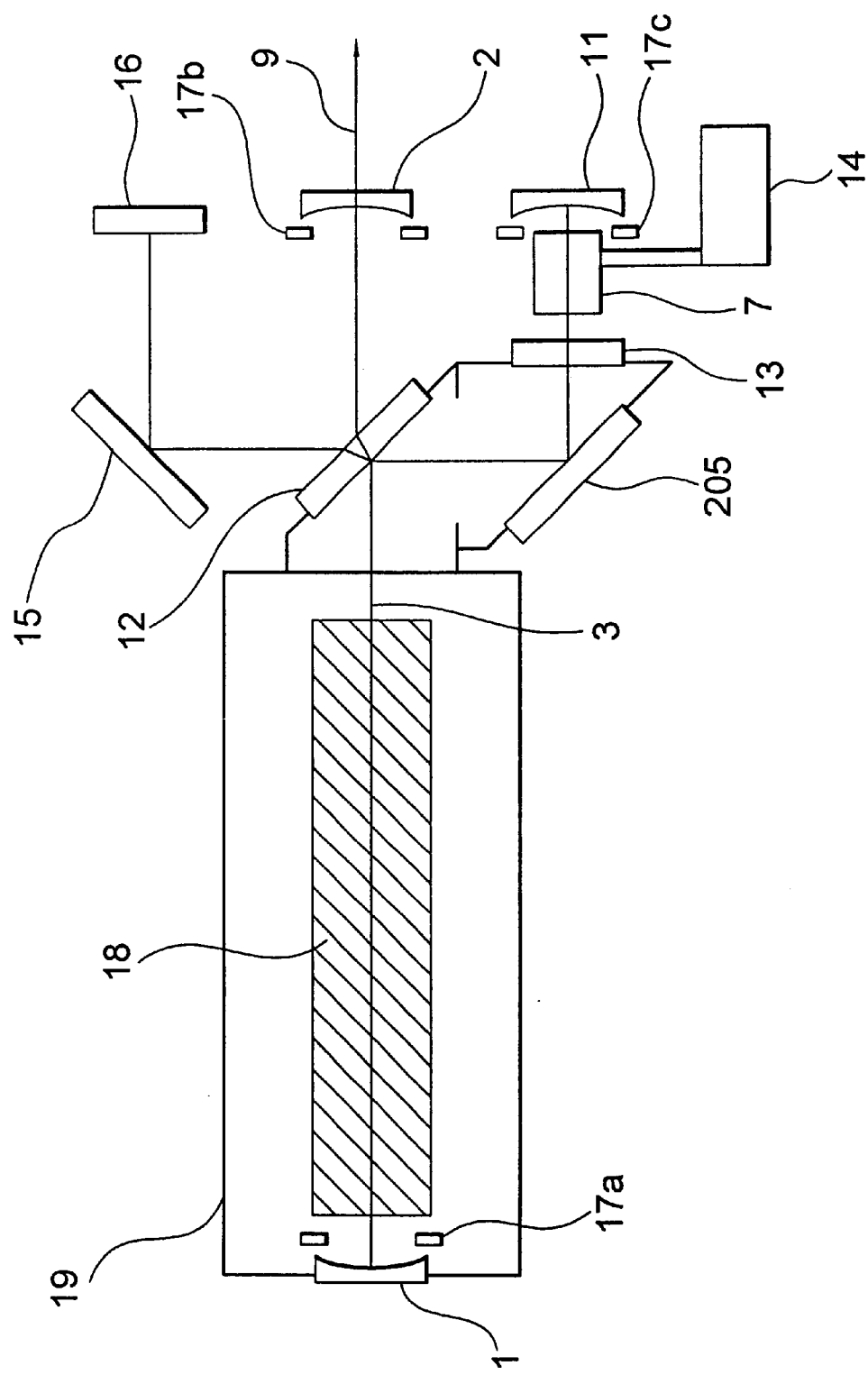
FIG. 5 is a schematic diagram illustrating the operation of the laser apparatus according to the first embodiment of the invention.

For example, as shown in FIG. 5, a laser apparatus may also be constructed according to the invention without using the quarter-wave plate 5. In this case, however, it is required to control the voltage applied from the variable pulse generator 14 to the electrooptical modulator 7 within the range from 0 to a half-wave voltage. In the example shown in FIG. 5, a total reflection mirror 205 made of for example Cu in the form of a plane mirror is used.

Although the total reflection mirror 11 is employed in the first embodiment described above, the invention is not limited to this.

Figure 6:
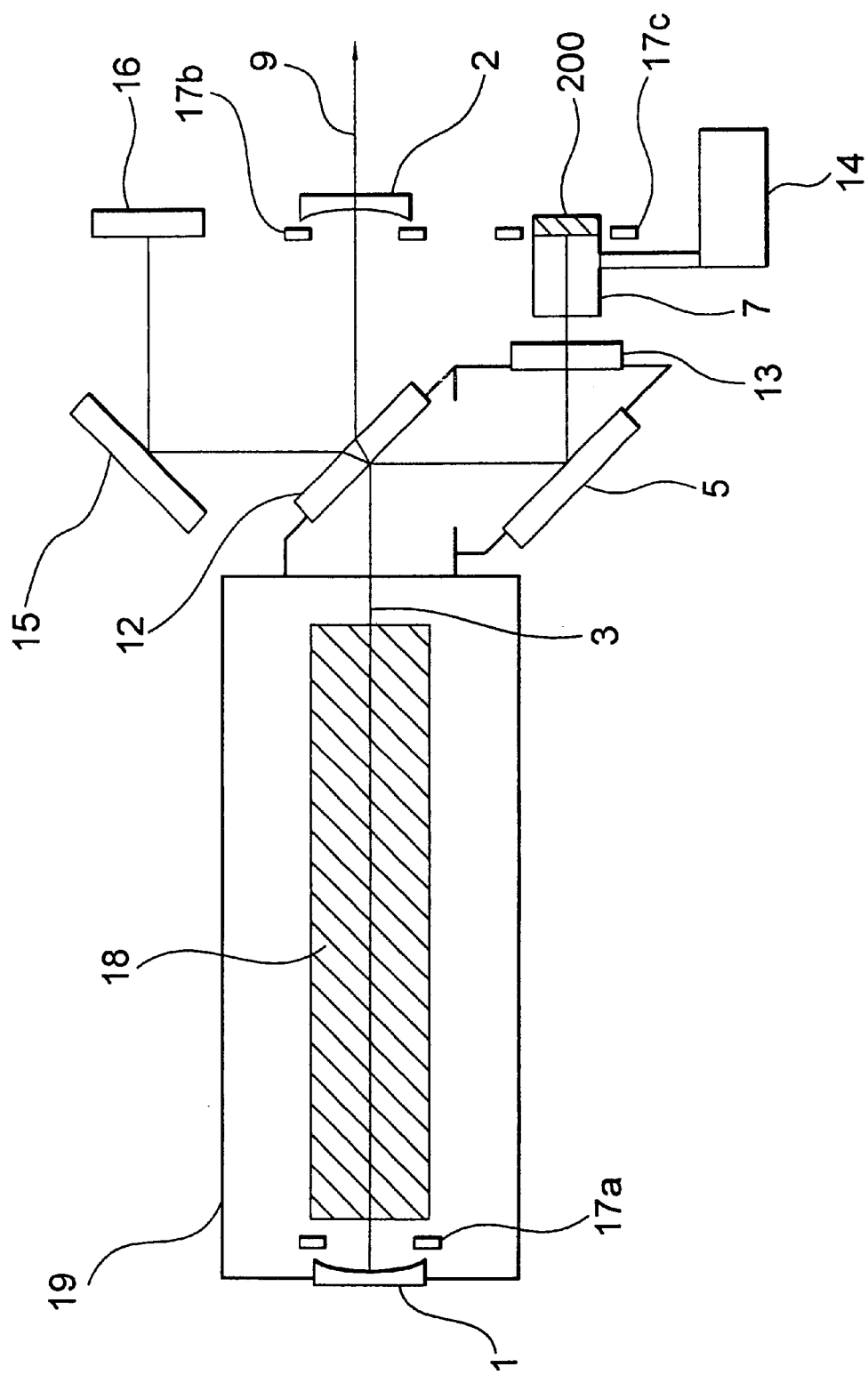
FIG. 6 is a schematic diagram illustrating the operation of the laser apparatus according to the first embodiment of the invention.

For example, as shown in FIG. 6, similar effects can be achieved by forming, using an evaporation technique, a total reflection film 200 on one side of the electrooptical modulator 7. In this structure, the laser resonator can be realized with a smaller number of optical elements and thus it becomes possible to realize a small-sized and low-cost $CO_2$ laser apparatus.

Although the transmission window 13 is employed in the first embodiment described above, the invention is not limited to this.

Figure 7:
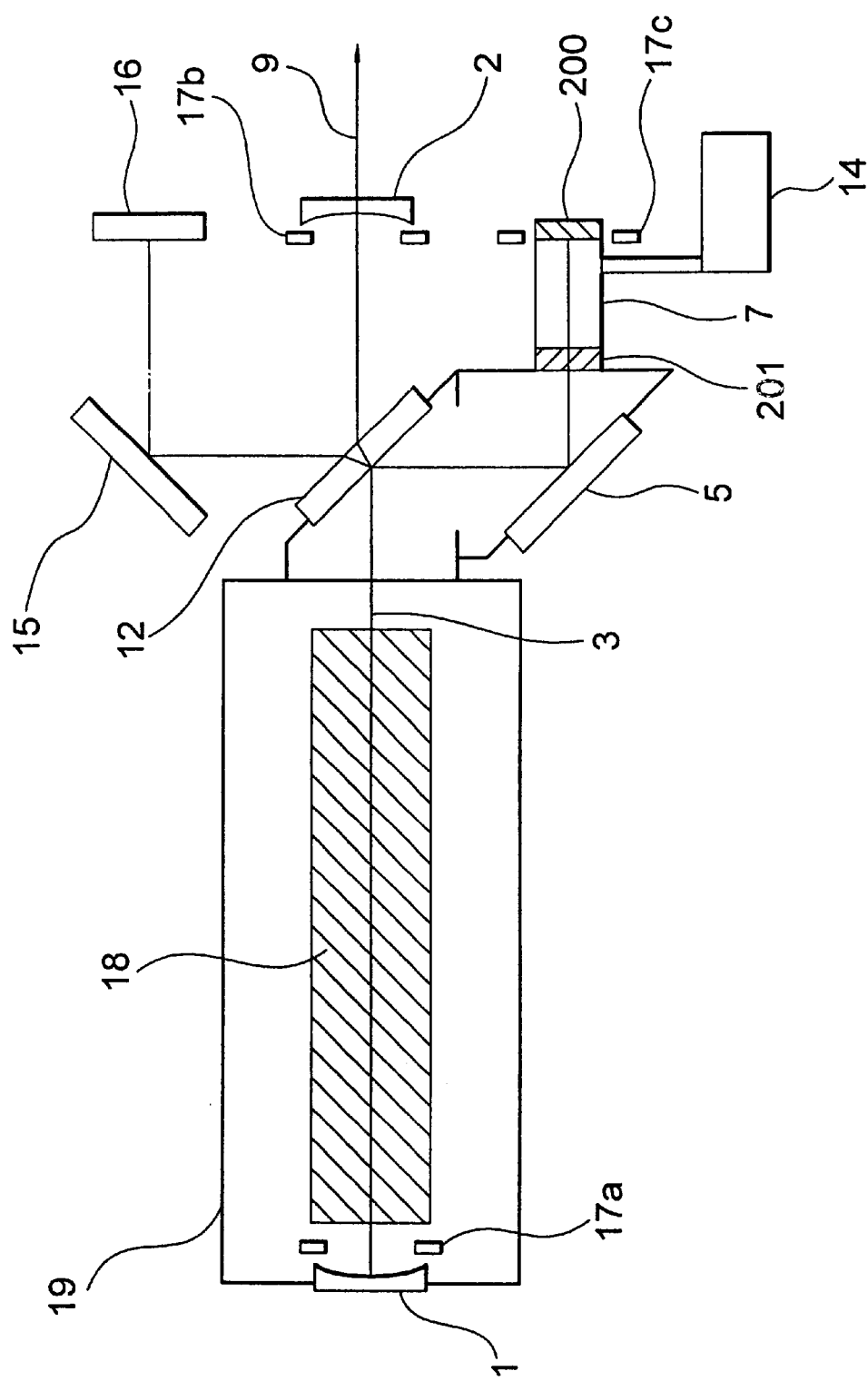
FIG. 7 is a schematic diagram illustrating the operation of the laser apparatus according to the first embodiment of the invention.

For example, as shown in FIG. 7, similar effects can be achieved by forming, using an evaporation technique, an antireflection film 201 on one side of the electrooptical modulator 7. In this structure, the laser resonator can be realized with a smaller number of optical elements and thus it becomes possible to realize a small-sized and low-cost $CO_2$ laser apparatus.

Although in the first embodiment described above the stable type resonator is employed as the laser resonator, the invention is not limited to this. For example, an unstable type resonator may also be employed to achieve similar effects.

Although in the first embodiment, the laser resonator is formed using the polarization control mirror 12 on which the laser beam 3 falls at 45°, the invention is not limited to this.

For example, similar effects may also be achieved using a Brewster mirror which transmits only the P polarization component of the laser beam 3 and reflects the S polarization component.

Although in the first embodiment, the reflection type quarter-wave plates 5 and 15 are used in the laser resonator, the invention is not limited to these.

For example, similar effects can also be achieved by employing transmission type quarter-wave plates. Alternatively, each quarter-wave plate may be replaced with two ⅛-wave plates.

Second Embodiment

Figure 8:
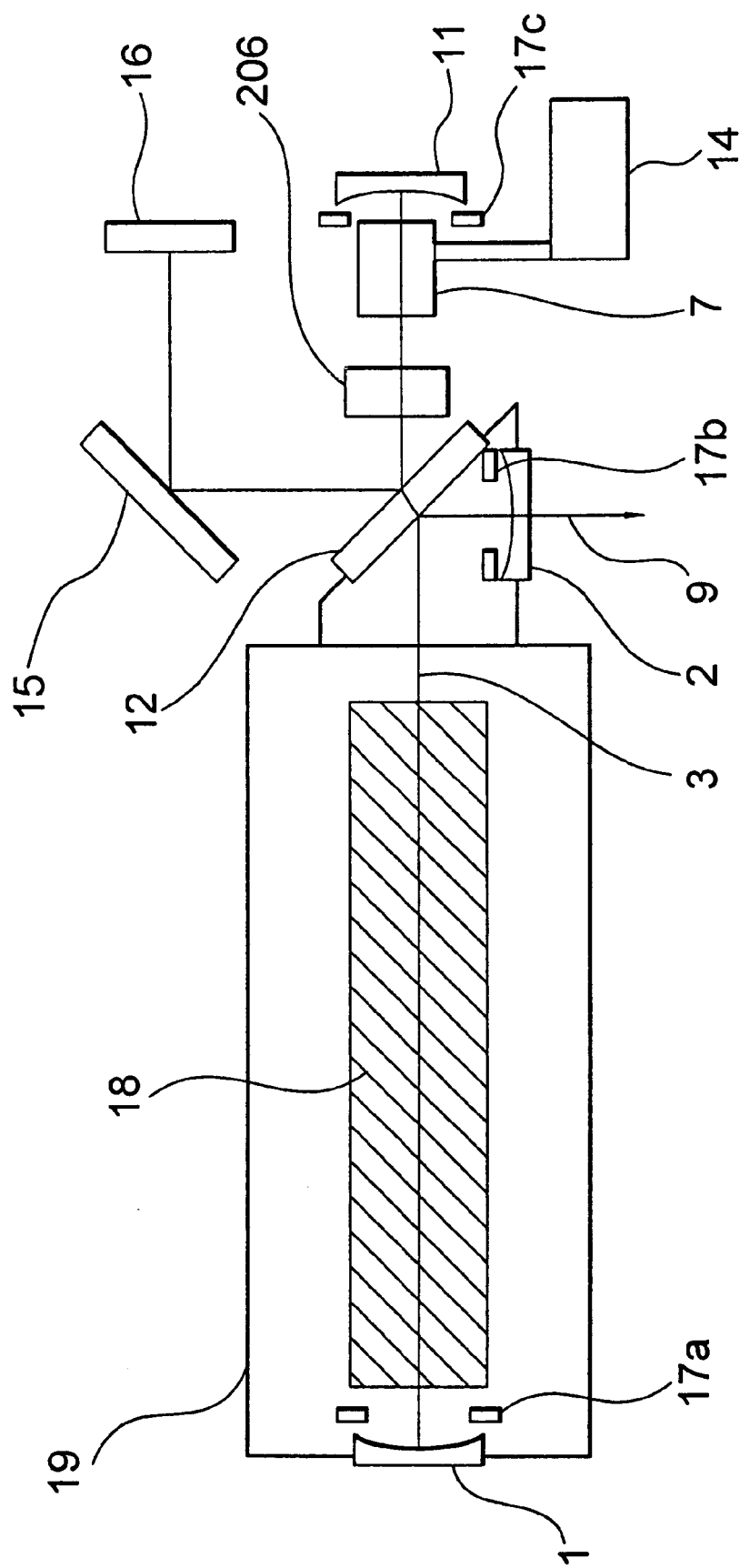
FIG. 8 is a cross-sectional view illustrating the construction of a laser apparatus according to a second embodiment of the invention.

FIG. 8 is a cross-sectional view illustrating the construction of a laser apparatus according to a second embodiment of the invention.

Figure 9:
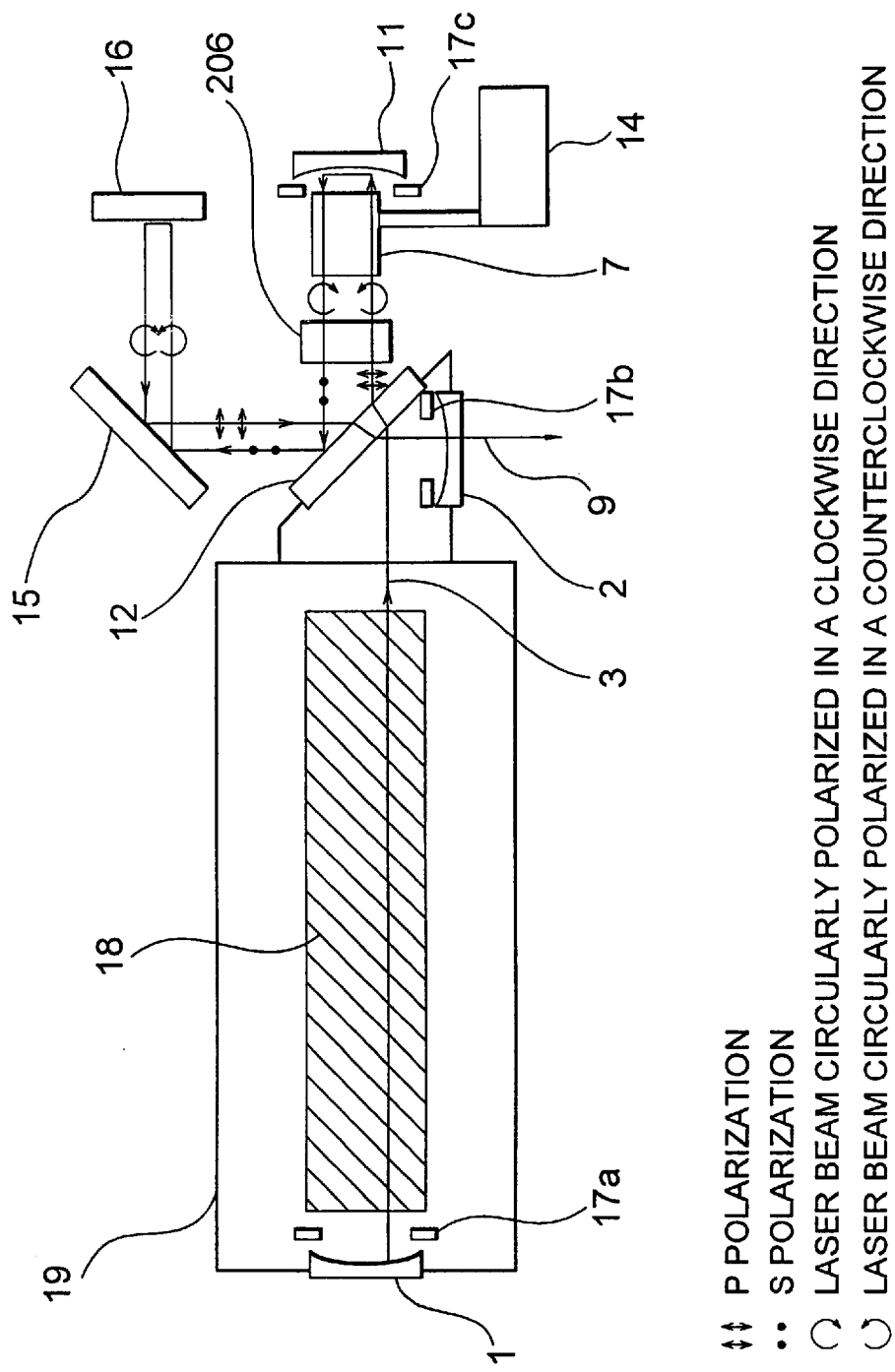
FIG. 9 is a schematic diagram illustrating the operation of the laser apparatus according to the second embodiment of the invention.
Figure 10:
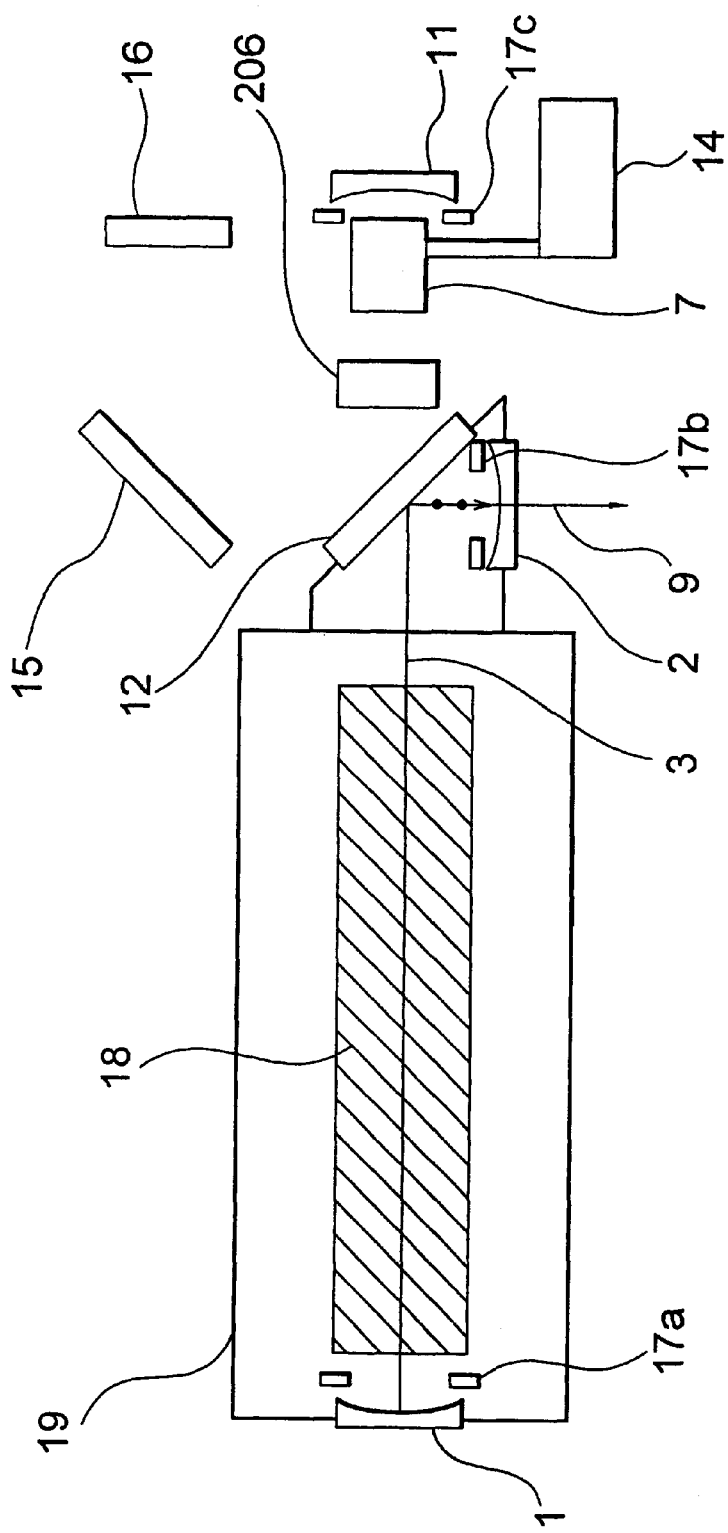
FIG. 10 is a schematic diagram illustrating the operation of the laser apparatus according to the second embodiment of the invention.

FIGS. 9 and 10 are schematic diagrams illustrating the operation of the laser apparatus according to the second embodiment of the invention.

In this second embodiment, as shown in FIG. 8, the laser apparatus has a structure similar to that of the first embodiment except that the partial reflection mirror 2 and the total reflection mirror 11 are disposed at locations different from those employed in the first embodiment and that there is provided a quarter-wave plate 206 disposed between the polarization control mirror 12 and the electrooptical modulator 7. In this second embodiment, the quarter-wave plate 15 and the total reflection mirror 16 constitute a second optical guiding element which converts a laser beam comprising an S polarization component reflected by the polarization control mirror 12 after having passing through the electrooptical modulator 7 into a laser beam comprising a P polarization component and returns it to the polarization control mirror 12.

This means that in this second embodiment, the P polarization component of the laser beam 3 and the S polarization component of the laser beam, behave in opposite manners to those in the first embodiment.

The operation of the second embodiment will be described below.

Referring first to FIG. 9, the operation is described for the case where no voltage is applied from the variable pulse generator 14 to the electrooptical modulator 7.

As shown in FIG. 9, the P polarization component of the laser beam 3 reflected by the total reflection mirror 1 passes through the polarization control mirror 12 and further passes through the transmission type quarter-wave plate 206. When the laser beam 3 passes through the quarter-wave plate 206, it becomes a laser beam circularly polarized in a counterclockwise direction. Because no voltage is applied to the electrooptical modulator 7, the laser beam 3 passes through the electrooptical modulator 7 while maintaining the circular polarization in the counterclockwise direction and is reflected by the total reflection mirror 11. As a result of the reflection by the total reflection mirror 11, the polarization is changed to circular polarization in a clockwise direction.

After being reflected by the total reflection mirror 11, the laser beam again passes through the electrooptical modulator 7 while maintaining the circular polarization in the clockwise direction and further passes through the quarter-wave plate 206. As a result of the passage through the quarter-wave plate 206, the laser beam becomes a linearly polarized beam comprising an S polarization component. The laser beam 3 comprising the S polarization component is then reflected by the polarization control mirror 12 and further by the quarter-wave plate 15. As a result, the polarization changes to circular polarization in a counterclockwise direction. This laser beam 3 is then reflected by the total reflection mirror 16 and becomes a beam circularly polarized in a clockwise direction. The laser beam 3 circularly polarized in the clockwise direction is again reflected by the quarter-wave plate 15 and becomes a linearly polarized laser beam comprising a P polarization component. The laser beam 3 then passes through the polarization control mirror 12 and reaches the partial reflection mirror 2. As a result, the P polarization component of the laser beam 3 which passes through the polarization control mirror 3 is reflected by the partial reflection mirror 2 back to the total reflection mirror 1 by an amount determined by the reflectivity of the partial reflecting mirror 2.

On the other hand, the S polarization component of the laser beam reflected by the total reflection mirror 1 is reflected by the polarization control mirror 12 and directly reaches the partial reflection mirror 2 as shown in FIG. 10 without traveling along the path for the P polarization component of the laser beam 3. As a result, the S polarization component of the laser beam 3 which is reflected by the polarization control mirror 12 is reflected by the partial reflection mirror 2 back to the total reflection mirror 2 by an amount determined by the reflectivity of the partial reflection mirror 2.

In this second embodiment of the invention, as in the first embodiment, when no voltage is applied from the variable pulse generator 14 to the electrooptical modulator 7, laser oscillation occurs in the optical path shown in FIG. 10 for the S polarization component which is reflected by the polarization control mirror 12 arid thus it is possible to perform continuous or pulse laser operation in the non-Q-switched mode without passing the laser beam 3 through the electrooptical modulator 7.

Furthermore, as in the first embodiment described above, by controlling the voltage applied from the variable pulse generator 14 to the electrooptical modulator 7 within the range from 0 to the quarter-wave voltage, it is possible to control the reflectivity of the partial reflection mirror 2 of the conventional laser resonator in the range from the intrinsic reflectivity of the partial reflection mirror 2 to 100%.

If a proper voltage in the range from 0 to the quarter-wave voltage is applied to the electrooptical modulator 7, the Q factor of the laser resonator for the S polarization component of the laser beam 3 reflected by the polarization control mirror 12 becomes greater than that for the P polarization component of the laser beam 3 which passes through the polarization control mirror 12, and thus the laser oscillation axis is switched.

When the laser medium is excited by input power lower than required to obtain laser oscillation for the S polarization component which is reflected by the polarization control mirror 12, if the voltage is applied from the variable pulse generator 14 to the electrooptical modulator 7, then Q-switched laser oscillation occurs along the switched oscillating optical axis. Because the optical axis in the Q-switched mode is on the optical axis of the partial reflection mirror 2, the laser beam 9 is output through the same single output port regardless of whether the operation is performed in the Q-switched mode or in the non-Q-switched continuous or pulse mode.

According to the present invention, it is possible to form the laser resonator in which laser oscillation occurs in the Q-switched mode and the laser resonator in which laser oscillation occurs in the non-Q-switched continuous or pulse mode in such a manner that they are independent of each other and thus the electrooptical modulator 7 is required to handle only the average power of the Q-switched pulse laser beam. Furthermore, the same laser medium is used in both operation modes and the laser beam 9 is output from the laser apparatus through the same single output port. This makes it possible to achieve a laser apparatus with a very small size. If this laser apparatus is used in a laser machining apparatus, it is possible to arbitrarily switch the operation mode as required between the Q-switched mode and the non-Q-switched continuous or pulse oscillation mode thereby achieving very high efficiency in the laser machining.

Third Embodiment

Figure 11:
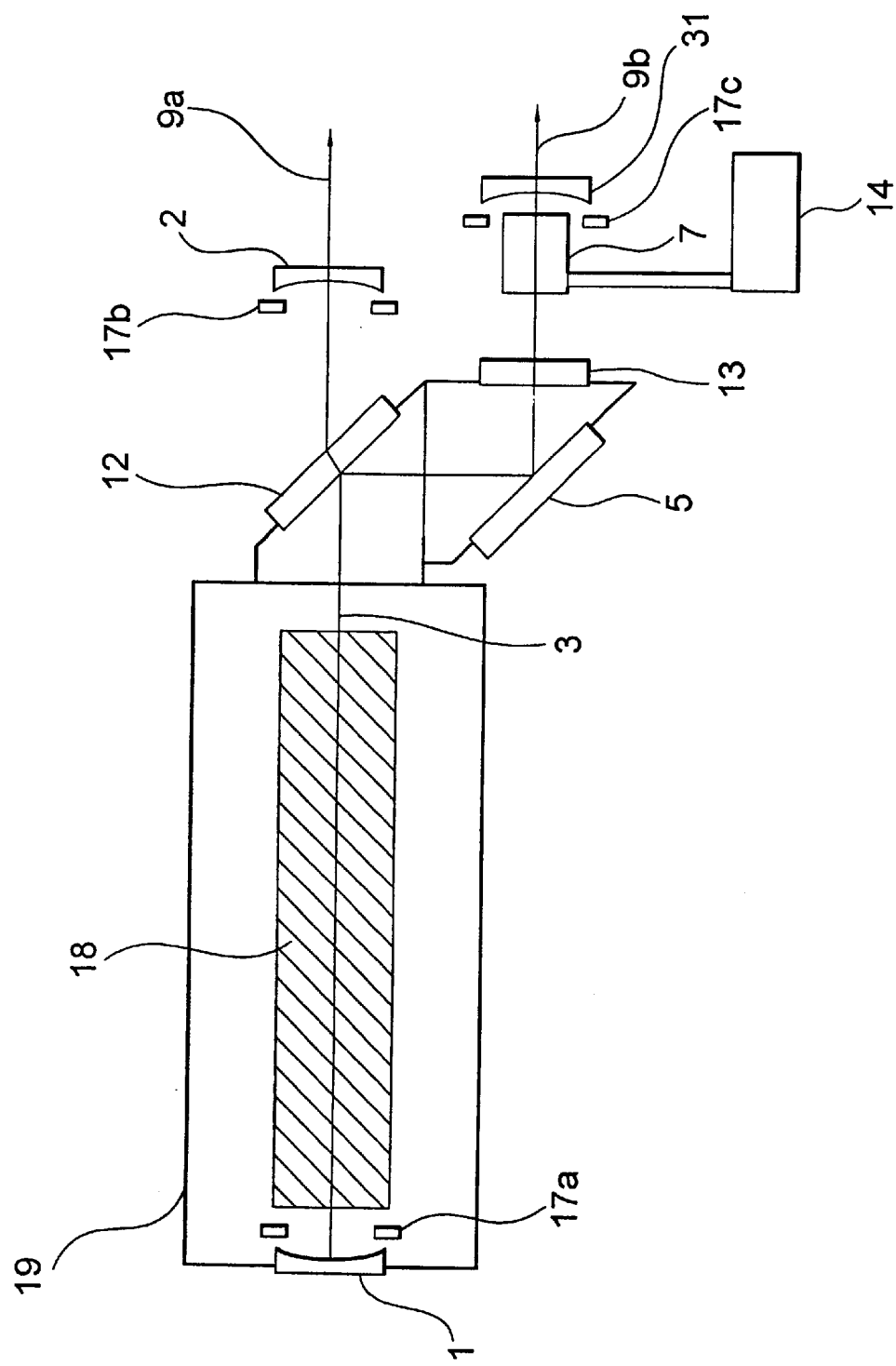
FIG. 11 is a cross-sectional view illustrating the construction of a laser apparatus according to a third embodiment of the invention.

FIG. 11 is a cross-sectional view illustrating the construction of a laser apparatus according to a third embodiment of the invention.

FIGS. 12 to 15 are schematic diagrams illustrating the operation of the laser apparatus according to the third embodiment of the invention.

In this third embodiment, unlike the first embodiment in which the laser beam is output from the laser apparatus through the same single output port regardless of whether the laser operation is performed in the Q-switched mode or the non-Q-switched continuous or pulse oscillation mode, the laser beam is output from the laser apparatus through different output ports, as shown in FIG. 11, depending on the operation mode.

Figure 12:
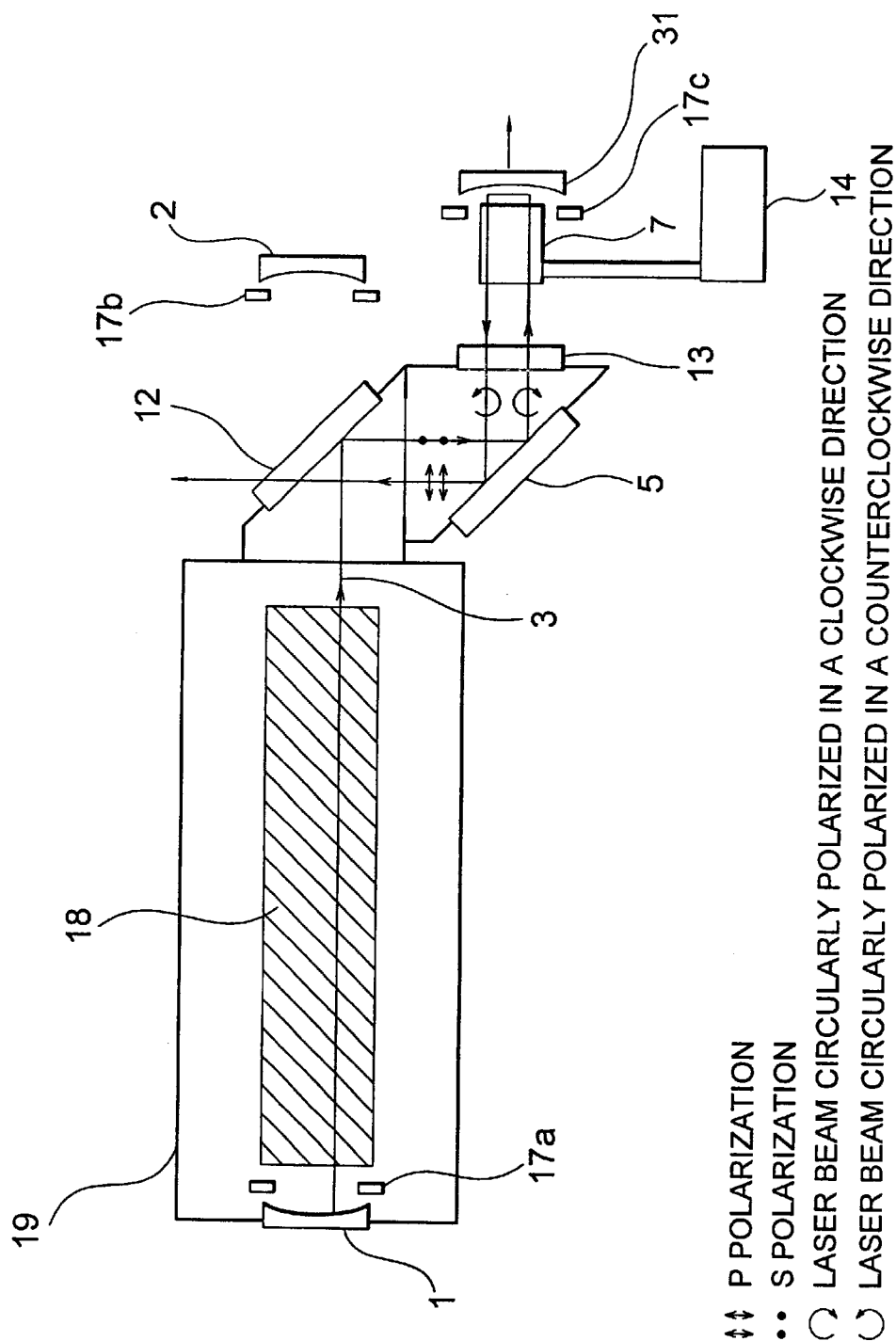
FIG. 12 is a schematic diagram illustrating the operation of the laser apparatus according to the third embodiment of the invention.

Referring first to FIG. 12, the operation of this embodiment is described below for the case where no voltage is applied from the variable pulse generator 14 to the electrooptical modulator 7.

In this case, as shown in FIG. 12, the S polarization component of the laser beam 3 reflected by the total reflection mirror 1 is reflected by the polarization control mirror 12 to the quarter-wave plate 5. The laser beam 3 is then reflected by the quarter-wave plate 5, and it becomes a laser beam circularly polarized in a clockwise direction. Because no voltage is applied to the electrooptical modulator 7, the laser beam 3 passes through the transmission window 13 and the electrooptical modulator 7 while maintaining the circular polarization in the clockwise direction.

After passing through the electrooptical modulator 7, the laser beam 3 is partially reflected by a partial reflection mirror 31 which is an additional element in this embodiment. As a result of the reflection by the partial reflection mirror 31, the laser beam 3 becomes a beam circularly polarized in a counterclockwise direction. The laser beam 3 again passes through the electrooptical modulator 7 and the transmission window 13 while maintaining the circular polarization in the counterclockwise direction and is then again reflected by the quarter-wave plate 5. As a result of the reflection by the quarter-wave plate 5, the laser beam 3 becomes a linearly polarized laser beam comprising a P polarization component. The laser beam 3 comprising the P polarization component passes through the polarization control mirror 12 and thus it does not return to the partial reflection mirror 2. This means that no laser oscillation occurs with the S polarization component of the laser beam.

Figure 13:
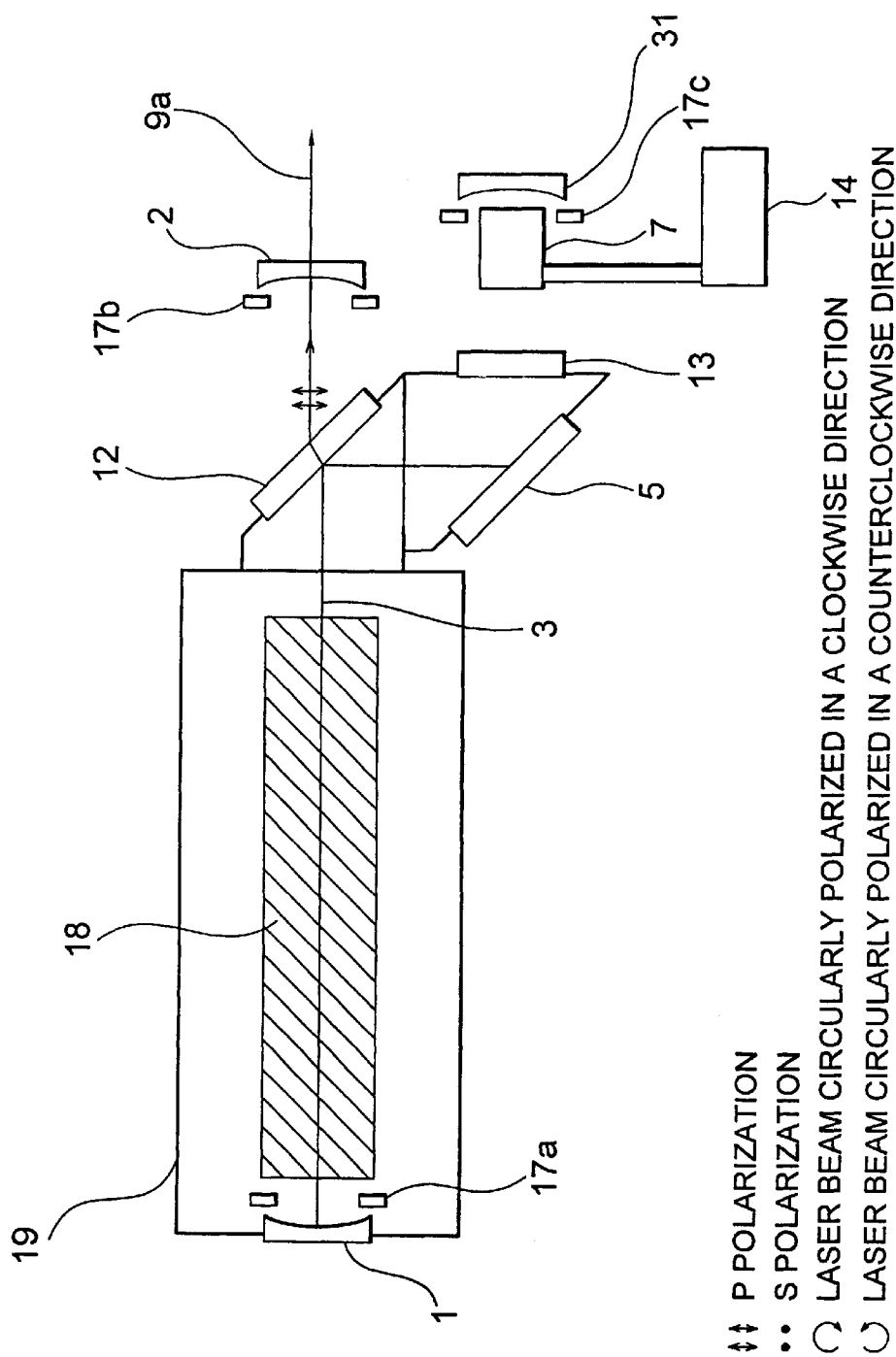
FIG. 13 is a schematic diagram illustrating the operation of the laser apparatus according to the third embodiment of the invention.

On the other hand, as shown in FIG. 13, the P polarization component of the laser beam reflected by the total reflection mirror 1 passes through the polarization control mirror 12 and directly reaches the partial reflection mirror 2 without traveling along the path for the S polarization component of the laser beam 3. Therefore, the P polarization component of the laser beam 3 which passes through the polarization control mirror 3 is reflected by the partial reflection mirror 2 back to the total reflection mirror 1 by an amount determined by the reflectivity of the partial reflecting mirror 2.

Thus in this embodiment, as in the first embodiment, when no voltage is applied from the variable pulse generator 14 to the electrooptical modulator 7, laser oscillation occurs in the optical path shown in FIG. 13 associated with the P polarization component of the laser beam 3 which passes through the polarization control mirror 12 and thus it is possible to perform continuous or pulse laser operation in the non-Q-switched mode without passing the laser beam 3 through the electrooptical modulator 7.

Furthermore, as in the first embodiment described above, by controlling the voltage applied from the variable pulse generator 14 to the electrooptical modulator 7 within the range from 0 to the quarter-wave voltage, it is possible to control the reflectivity of the partial reflection mirror 31 in the range from 0% to the intrinsic reflectivity of the partial reflection mirror 31. If a proper voltage is applied to the electrooptical modulator 7, the Q factor of the laser resonator for the S polarization component of the laser beam 3 reflected by the polarization control mirror 12 becomes greater than that for the P polarization component of the laser beam 3 which passes through the polarization control mirror 12, and thus the laser oscillation axis is switched. When the laser medium is excited by input power lower than required to obtain laser oscillation for the P polarization component which passes through the polarization control mirror 12, if the voltage is applied from the variable pulse generator 14 to the electrooptical modulator 7, then Q-switched laser oscillation occurs along the switched oscillating optical axis.

In this third embodiment, as described above, there are two output ports through which the laser beam is output. Alternatively, there may be provided additional optical elements disposed outside the laser resonator as shown in FIG. 14 so that these additional optical elements cause the laser beam 3 to be output through the same single output port.

Figure 14:
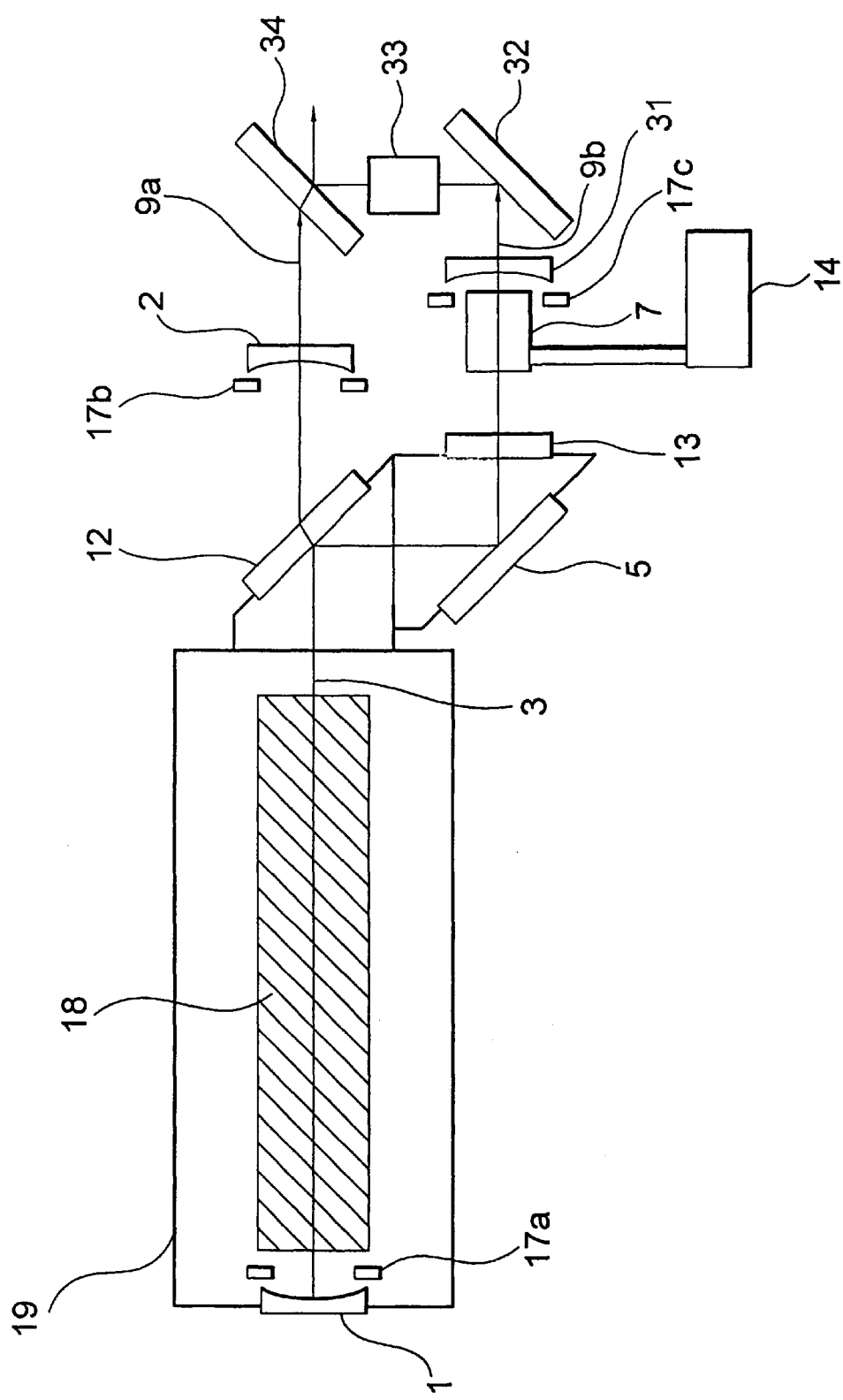
FIG. 14 is a schematic diagram illustrating the operation of the laser apparatus according to the third embodiment of the invention.

In the example shown in FIG. 14, the laser apparatus includes a zero-shift mirror 32, a half-wave plate 33, and a polarization control mirror 34. The zero-shift mirror 32 is a mirror which reflects the laser beam while preserving the polarization.

In FIG. 14, the laser beam 9b output through the partial reflection mirror 31 is a beam comprising a P polarization component and the laser beam 9a output through the partial reflection mirror 2 is also a beam comprising a P polarization component. Therefore, if either one of these two laser beams is converted into a laser beam comprising an S polarization component and if the two laser beams comprising the P and S polarization components, respectively, are combined together using the polarization control mirror 34, then both laser beams are finally output through the same single output port with the same single optical axis.

In this specific example, the laser beam 9b comprising the P polarization component output through the partial reflection mirror 31 is directed by the zero-shift mirror 32 to the half-wave plate 33 and converted by the half-wave plate 33 to a laser beam comprising an S polarization component. The laser beam 9b comprising the S polarization component and the laser beam 9a comprising the P polarization component output through the partial reflection mirror 2 are combined together by the polarization control mirror 34.

Figure 15:
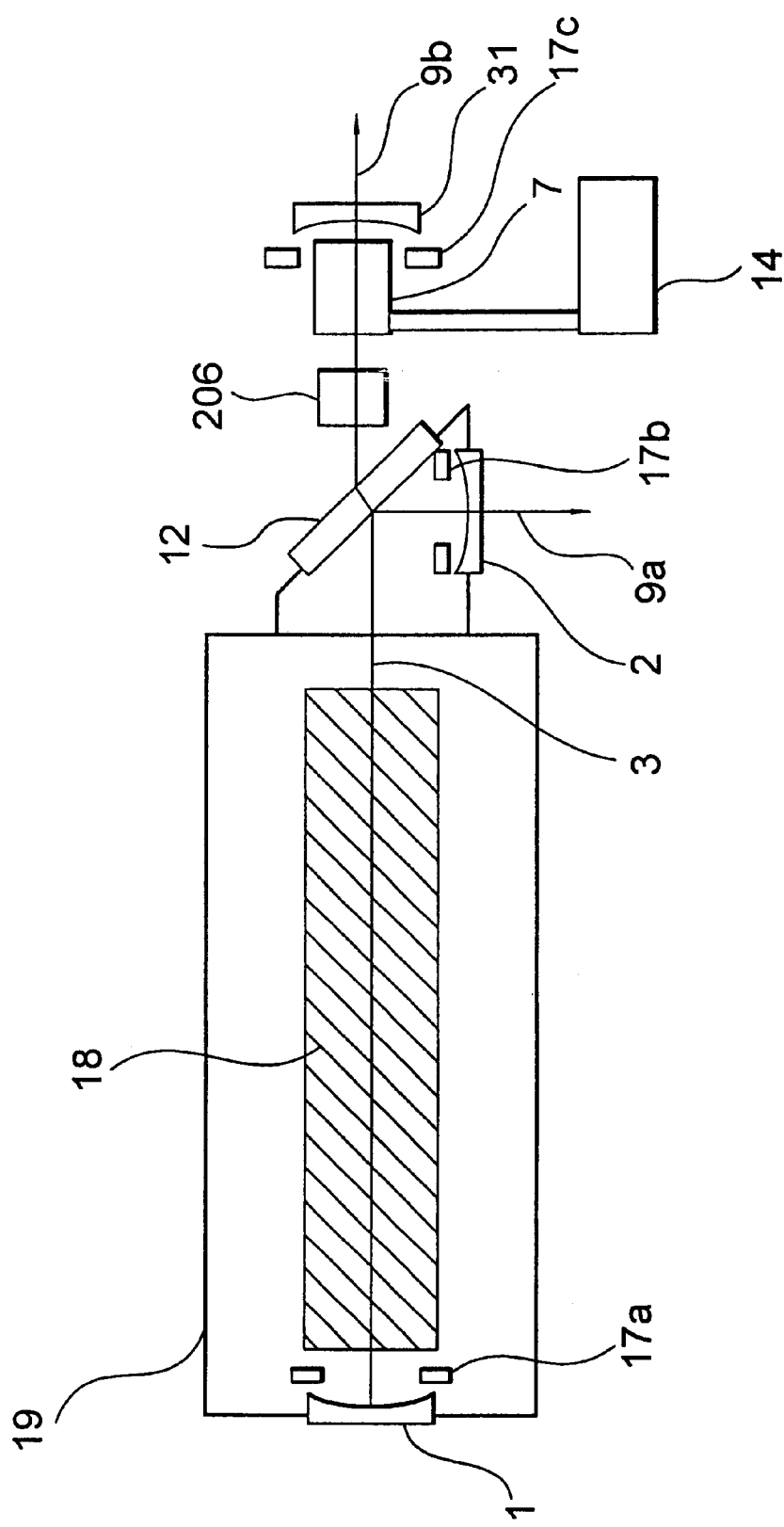
FIG. 15 is a schematic diagram illustrating the operation of the laser apparatus according to the third embodiment of the invention.

FIG. 15 illustrates an alternative embodiment in which the S polarization component of the laser beam and the P polarization component of the laser beam behave in opposite manners to those in the above-described embodiment.

Fourth Embodiment

Figure 16:
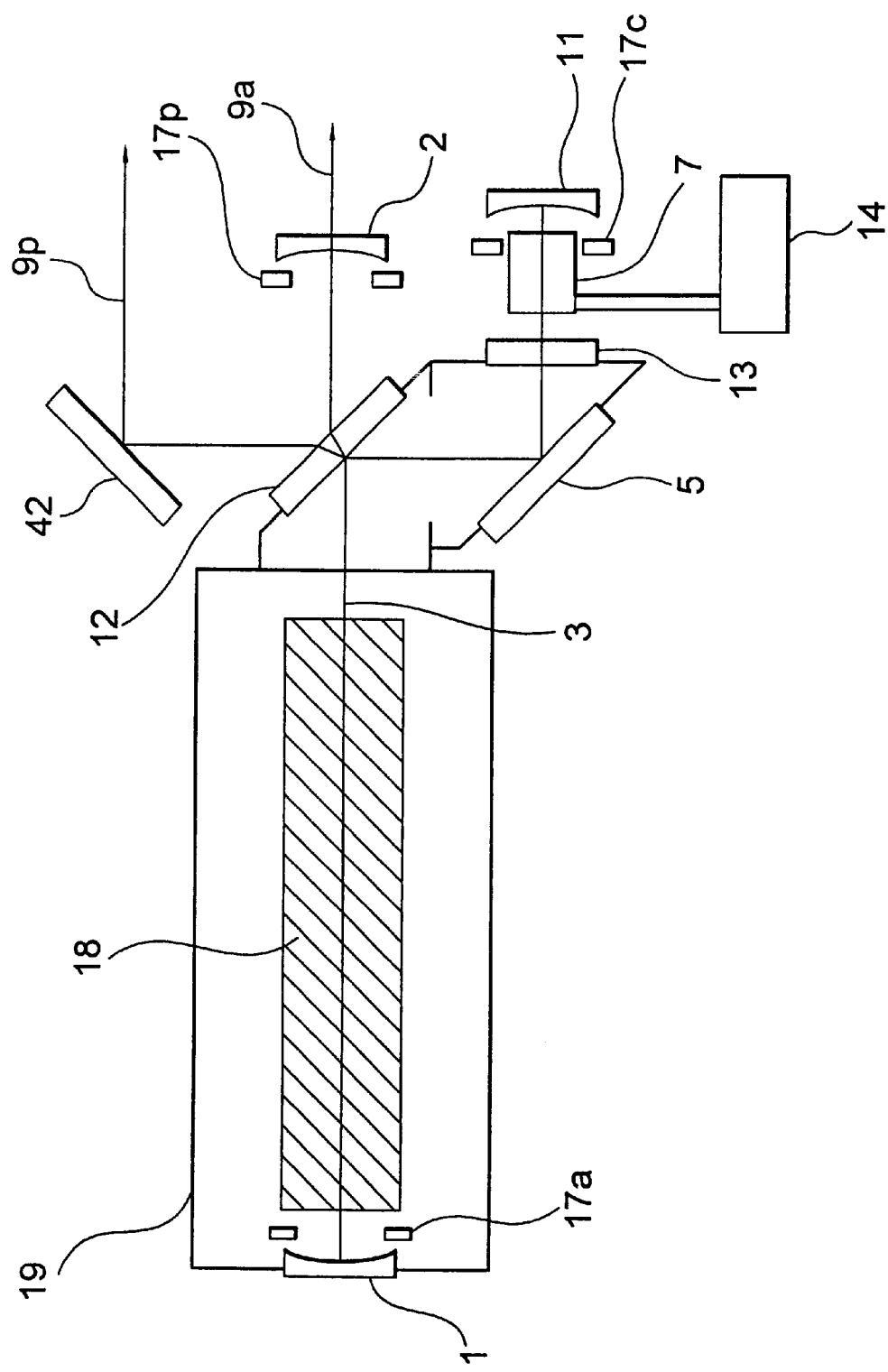
FIG. 16 is a cross-sectional view illustrating the construction of a laser apparatus according to a fourth embodiment of the invention.

FIG. 16 is a cross-sectional view illustrating the construction of a laser apparatus according to a fourth embodiment of the invention.

FIGS. 17 to 20 are schematic diagrams illustrating the operation of the laser apparatus according to the fourth embodiment of the invention.

In FIGS. 16 to 20, those parts similar to those in the first embodiment are denoted by similar reference numerals and they are not described in further detail here. As shown in FIG. 16, the laser apparatus according to the fourth embodiment of the invention includes a zero-shift mirror 42 which reflects a laser beam without causing a phase modulation.

Unlike the laser apparatus according to the first embodiment in which the laser beam is output from the laser apparatus through the same single output port regardless of whether the operation is performed in the Q-switched mode or in the non-Q-switched continuous or pulse mode, the laser apparatus according to the fourth embodiment of the invention includes two output ports as shown in FIG. 16 so that a laser beam generated in the Q-switched mode and a laser beam generated in the non-Q-switched continuous or pulse mode are output through different output ports. The basic operation is similar to the first embodiment described above and similar effects can be achieved.

The operation of this embodiment will be described below.

First, the operation is described below for the case where no voltage is applied from the variable pulse generator 14 to the electrooptical modulator 7.

Figure 17:
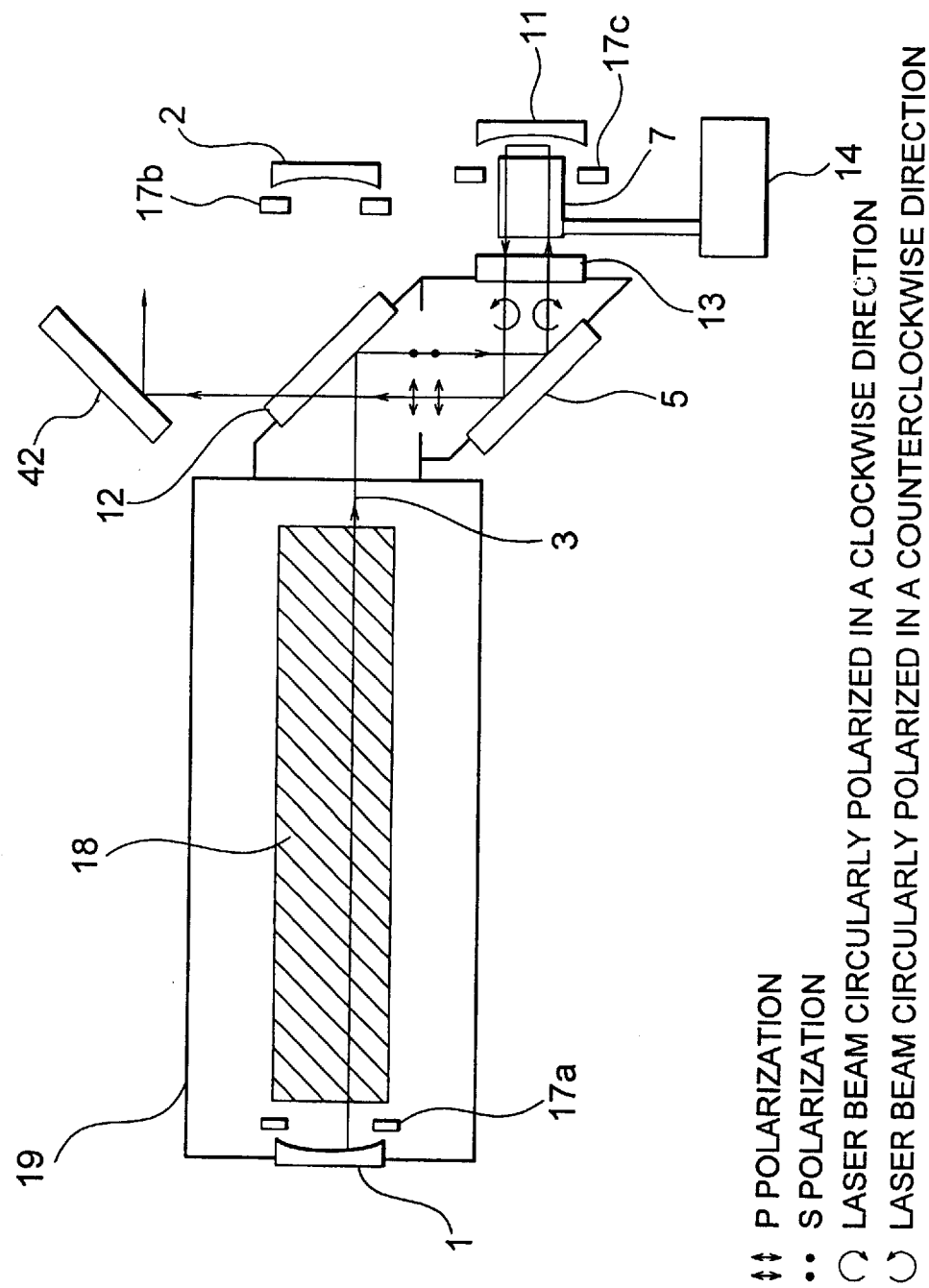
FIG. 17 is a schematic diagram illustrating the operation of the laser apparatus according to the fourth embodiment of the invention.

In this case, as shown in FIG. 17, the S polarization component of the laser beam 3 reflected by the total reflection mirror 1 is reflected by the polarization control mirror 12 to the quarter-wave plate 5. The laser beam 3 is then reflected by the quarter-wave plate 5, and it becomes a laser beam circularly polarized in a clockwise direction. Because no voltage is applied to the electrooptical modulator 7, the laser beam 3 passes through the transmission window 13 and the electrooptical modulator 7 while maintaining the circular polarization in the clockwise direction.

The laser beam 3 is then reflected by the total reflection mirror 11 and becomes a laser beam circularly polarized in a counterclockwise direction. The laser beam 3 again passes through the electrooptical modulator 7 and the transmission window 13 while maintaining the circular polarization in the counterclockwise direction and is then again reflected by the quarter-wave plate 5. As a result of the reflection by the quarter-wave plate 5, the laser beam 3 becomes a linearly polarized laser beam comprising a P polarization component. The laser beam 3 comprising the P polarization component passes through the polarization control mirror 12 and thus it does not return to the partial reflection mirror 2. This means that no laser oscillation occurs with the S polarization component of the laser beam.

Figure 18:
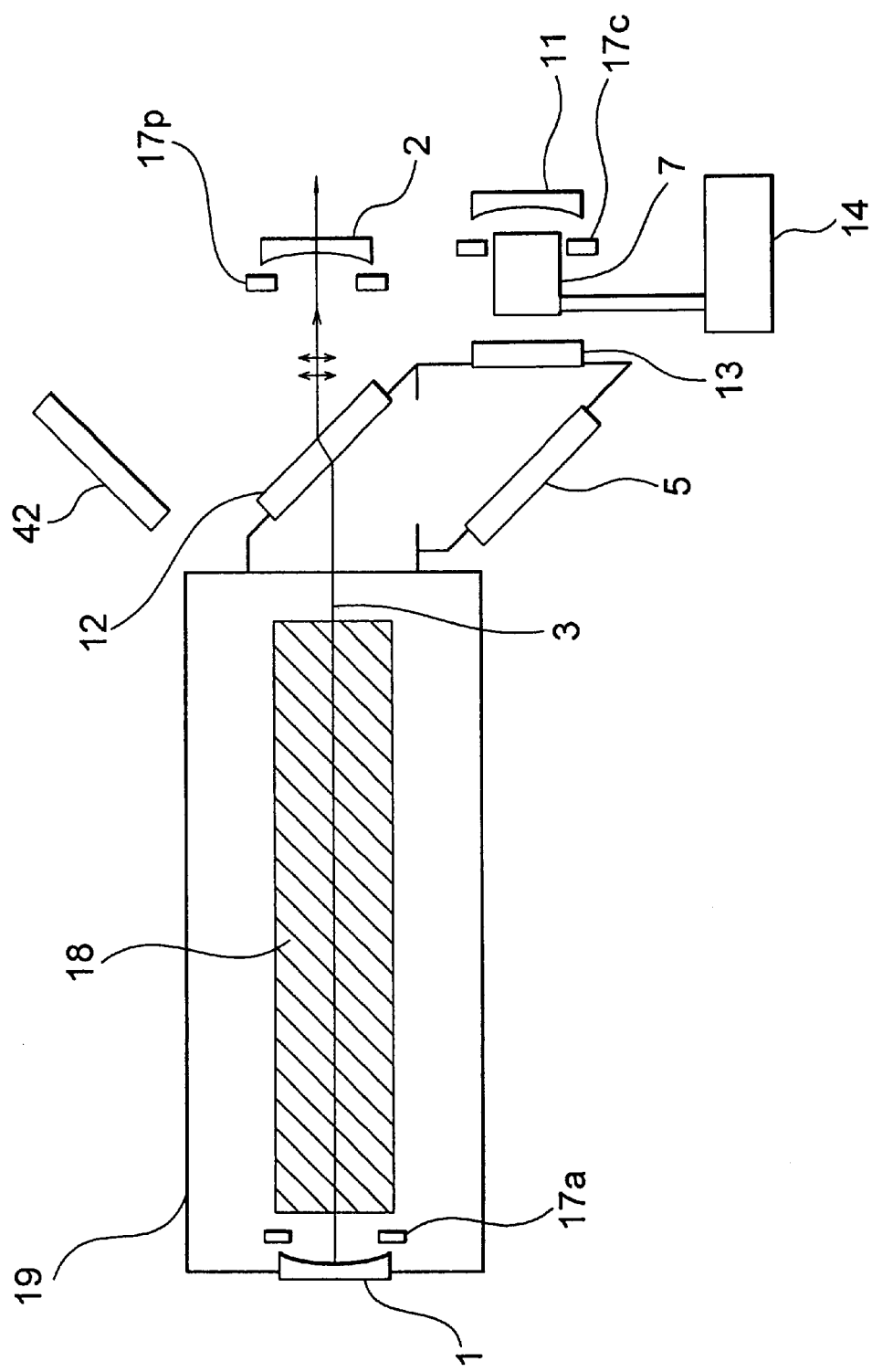
FIG. 18 is a schematic diagram illustrating the operation of the laser apparatus according to the fourth embodiment of the invention.
Figure 19:
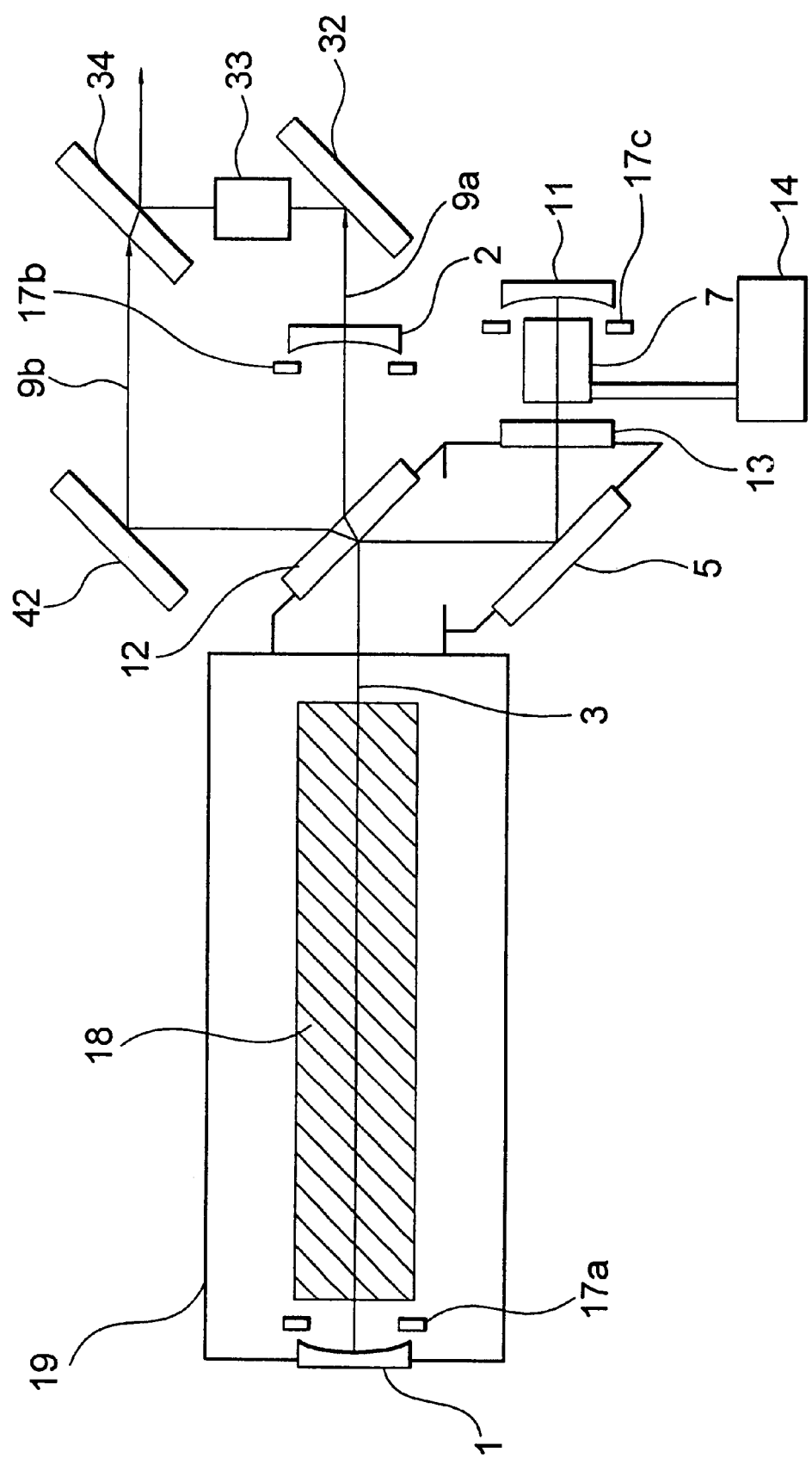
FIG. 19 is a schematic diagram illustrating the operation of the laser apparatus according to the fourth embodiment of the invention.

On the other hand, as shown in FIG. 18, the P polarization component of the laser beam reflected by the total reflection mirror 1 passes through the polarization control mirror 12 and directly reaches the partial reflection mirror 2 without traveling along the path for the S polarization component of the laser beam 3. Therefore, the P polarization component of the laser beam 3 which passes through the polarization control mirror 3 is reflected by the partial reflection mirror 2 back to the total reflection mirror 1 by an amount determined by the reflectivity of the partial reflecting mirror 2.

As described above in this fourth embodiment, as in the first embodiment, when no voltage is applied from the variable pulse generator to the electrooptical modulator 7, laser oscillation occurs in the optical path shown in FIG. 18 associated with the P polarization component of the laser beam 3 which passes through the polarization control mirror 12 and thus it is possible to perform continuous or pulse laser operation in the non Q-switched mode without passing the laser beam 3 through the electrooptical modulator 7.

Furthermore, as in the first embodiment described above, by controlling the voltage applied from the variable pulse generator 14 to the electrooptical modulator 7 within the range from 0 to the quarter-wave voltage, it is possible to control the effective reflectivity of the partial reflection mirror 2, through which the Q-switched laser beam is output, in the range from 0% to 100%.

If a proper voltage in the range from 0 to the quarter-wave voltage is applied to the electrooptical modulator 7, the Q factor of the laser resonator for the S polarization component of the laser beam 3 reflected by the polarization control mirror 12 becomes greater than that for the P polarization component of the laser beam 3 which passes through the polarization control mirror 12, and thus the laser oscillation axis is switched. When the laser medium is excited by input power lower than required to cause laser oscillation for the P polarization component which passes through the polarization control mirror 12, if the voltage is applied from the variable pulse generator 14 to the electrooptical modulator 7, then Q-switched laser oscillation occurs along the switched oscillating optical axis.

In this fourth embodiment, as described above, there are two output ports for outputting the laser beam. If there are provided, outside the laser resonator, additional optical elements, as in the third embodiment, including a zero-shift mirror 32, a half-wave plate 33, and a polarization control mirror 34, the laser beam can have a single optical axis.

Figure 20:
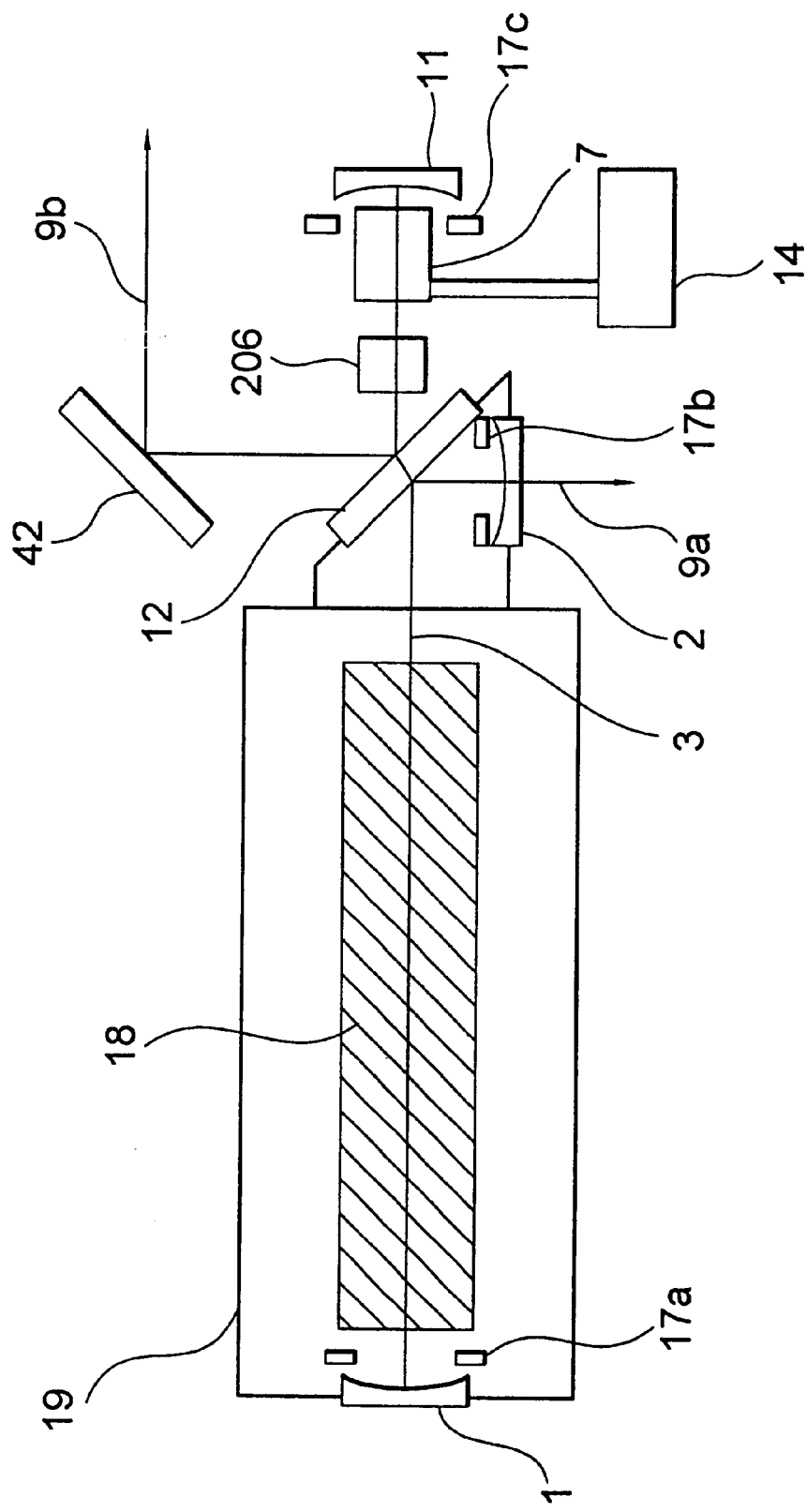
FIG. 20 is a schematic diagram illustrating the operation of the laser apparatus according to the fourth embodiment of the invention.

Furthermore, the respective optical elements may be disposed as shown in FIG. 20 so that the S polarization component and the P polarization component behave in opposite manners to those described above.

Fifth Embodiment

FIGS. 21, 23, 25, 26, 29, and 30 illustrate the change over time in the reflectivity of the lasher resonator of the laser apparatus according to a fifth embodiment of the invention.

Figure 22:
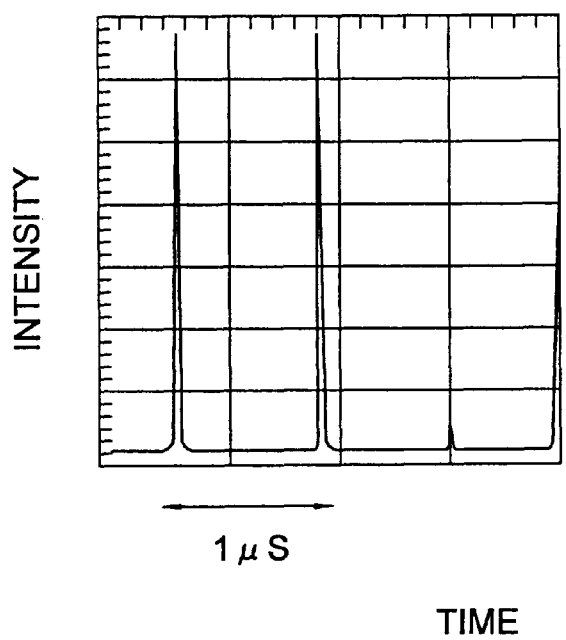
FIG. 22 illustrates the Q-switched pulse characteristic of the laser apparatus according to the fifth embodiment of the invention.
Figure 24:
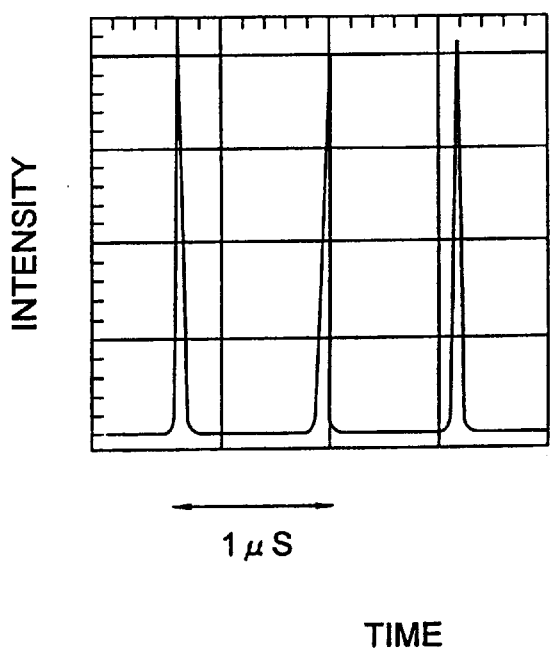
FIG. 24 illustrates the Q-switched pulse characteristic of the laser apparatus according to the fifth embodiment of the invention.

FIGS. 22, 24, and 27 illustrate Q-switched pulse characteristics of the laser apparatus according to the fifth embodiment of the present invention.

Figure 28:
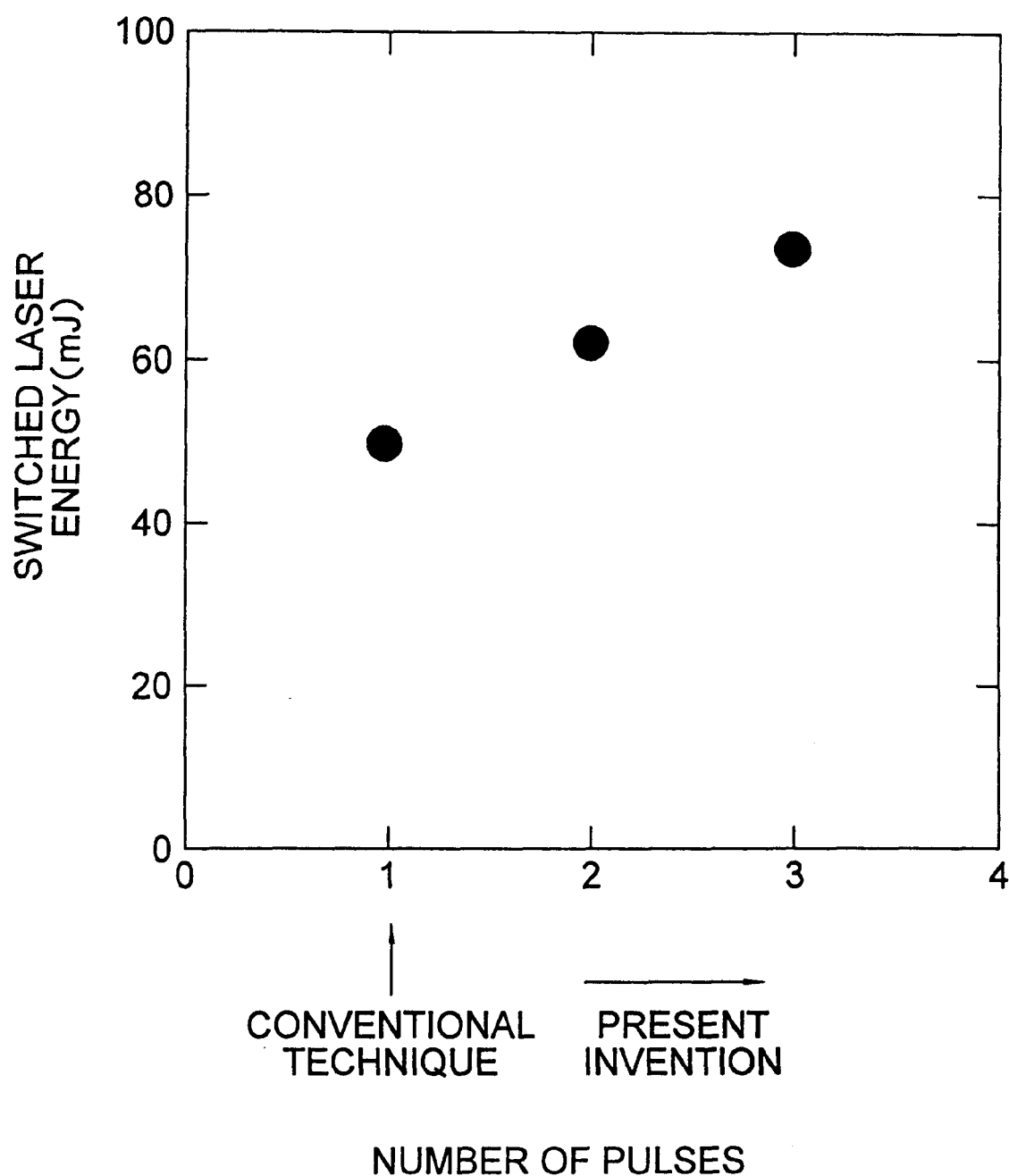
FIG. 28 illustrates the output characteristic of the laser apparatus according to the fifth embodiment of the invention.

FIG. 28 illustrates the output characteristic of the laser apparatus according to the fifth embodiment of the present invention.

Figure 21:
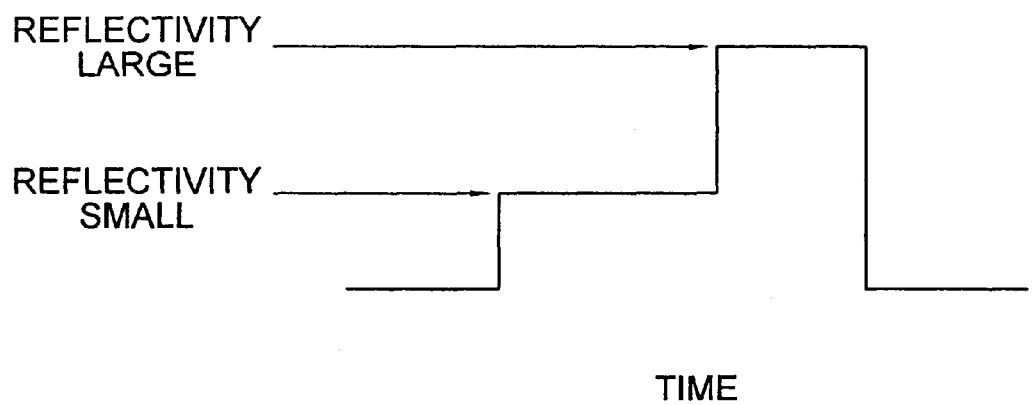
FIG. 21 illustrates the change, over time, in the reflectivity of a laser resonator of a laser apparatus according to a fifth embodiment of the invention.

FIG. 21 illustrates the change in the reflectivity of the laser resonator over time for one cycle, which occurs in response to the change in the pulse voltage applied from the variable pulse generator 14 to the electrooptical modulator 7. In this specific example, the change in the reflectivity is obtained by changing the pulse voltage applied to the electrooptical modulator 7 in a two-level step fashion during one cycle.

In this fifth embodiment, the voltage waveform of each cycle of periodic voltage applied to the electrooptical modulator 7 is controlled so that laser oscillation occurs at a lower peak power than that of a laser beam obtained in the conventional Q-switched operation with the laser energy per pulse higher than that obtained by the conventional technique.

The Q-switched operation of the laser apparatus according to this embodiment will be described below with reference to figures for the case where a pulse voltage varying as a periodic function of time daring each cycle is applied from the variable pulse generator 14 to the electrooptical modulator 7.

Figure 37:
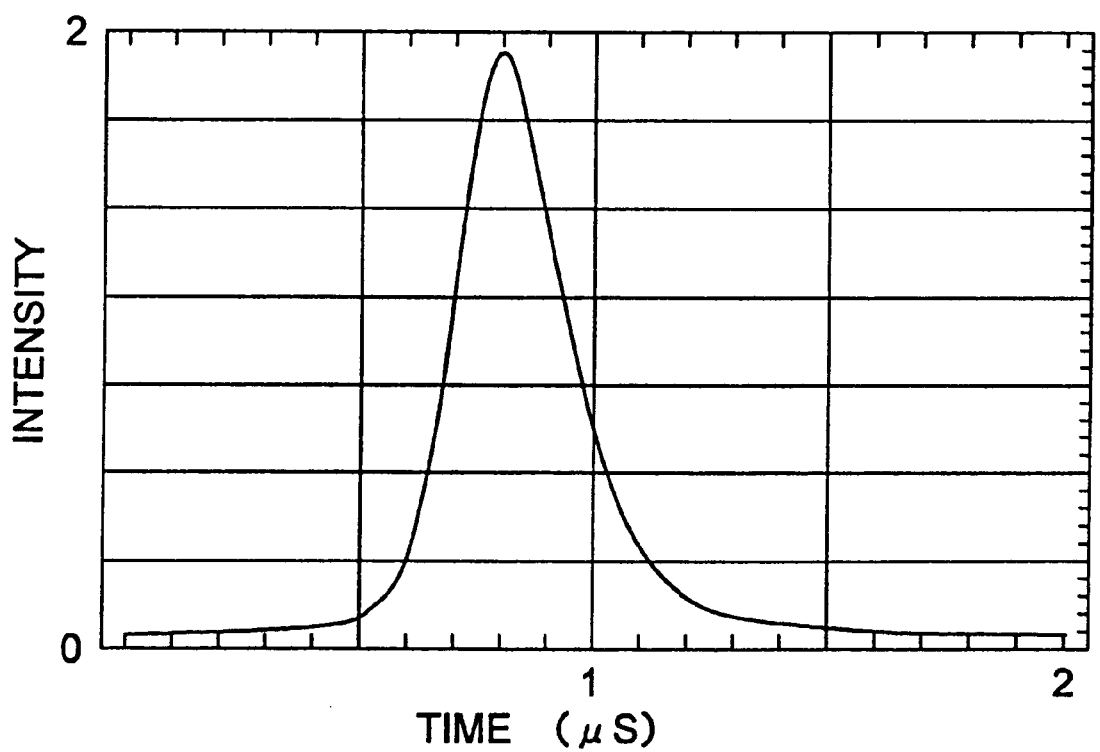
FIG. 37 illustrates the output characteristic of the conventional laser apparatus operating in the Q-switched mode.
Figure 38:
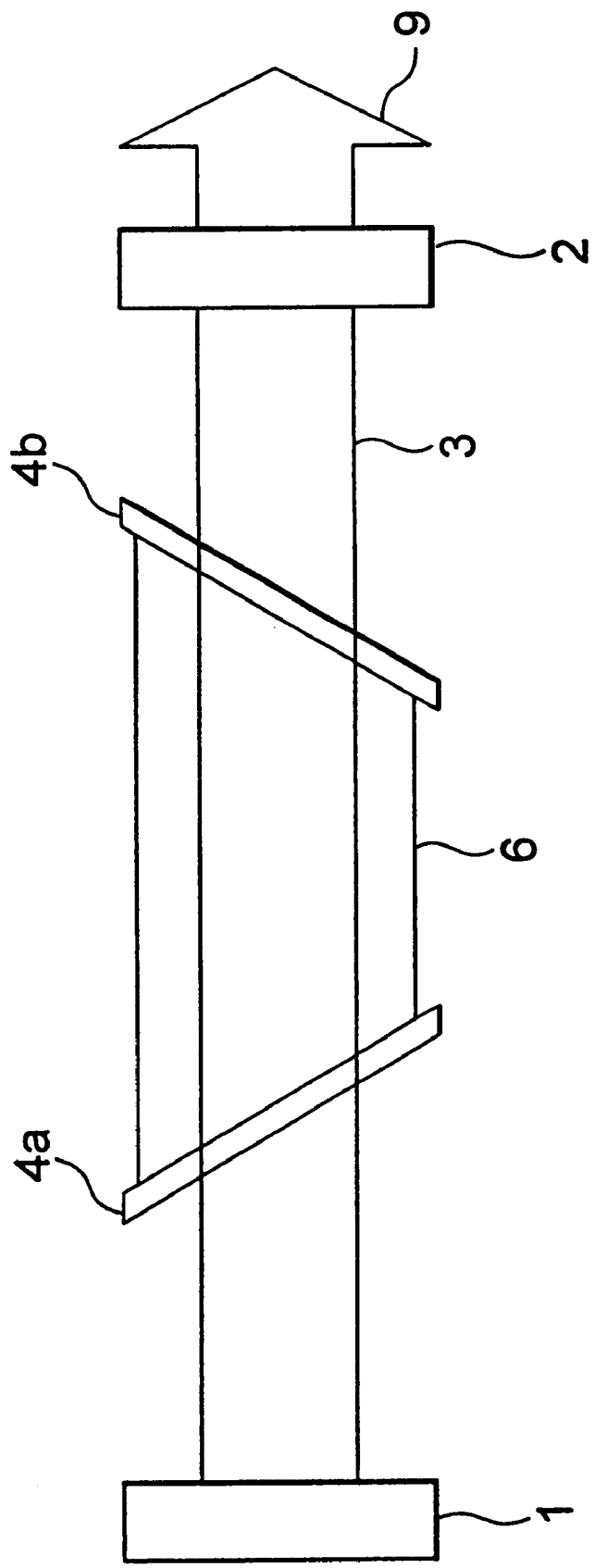
FIG. 38 is a schematic diagram illustrating the operation of the conventional Q-switched $CO_2$ laser apparatus.
Figure 39:
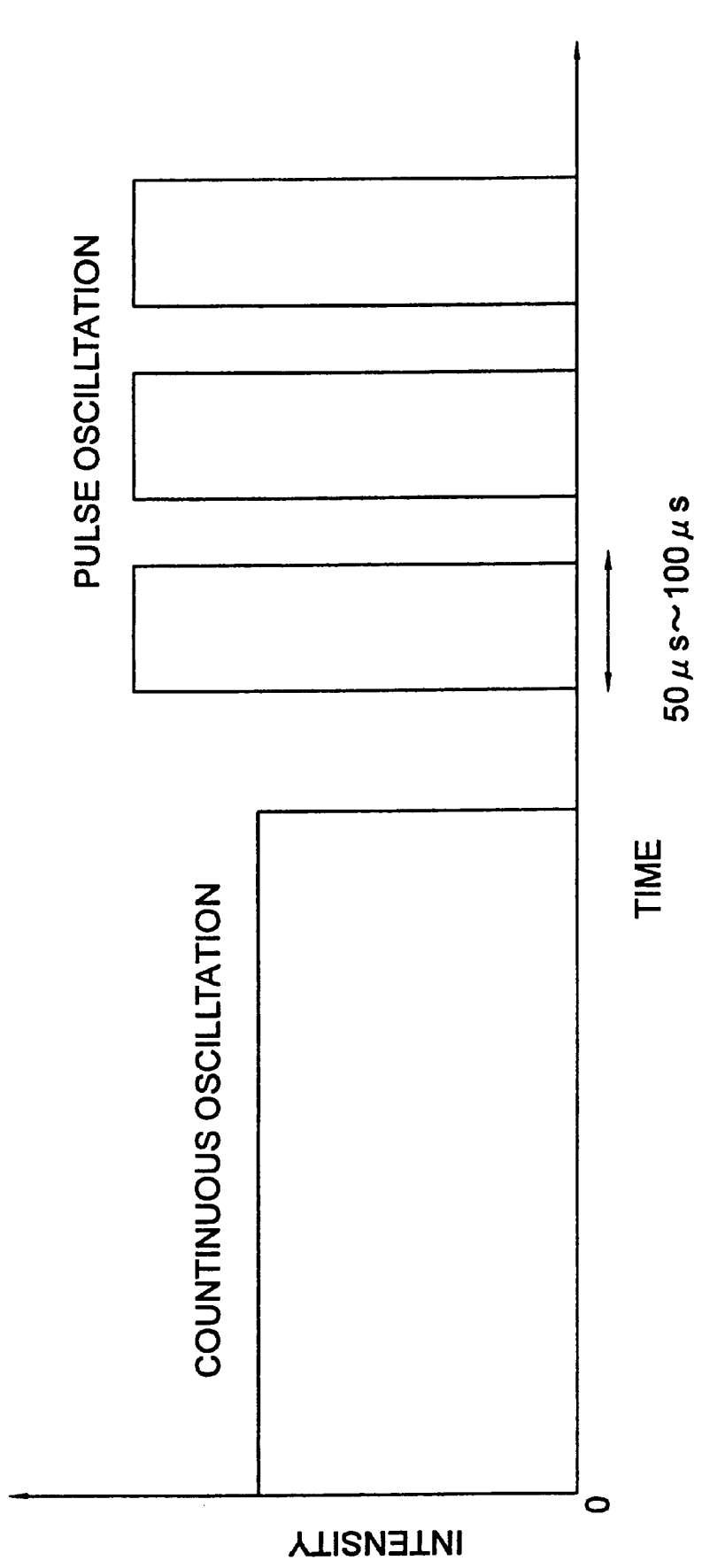
FIG. 39 illustrates the waveform of pulses output by the conventional laser apparatus operating in the non-Q-switched pulse mode.

FIG. 22 illustrate the Q-switched laser oscillation characteristic as a function of time during one cycle for the case where the reflectivity of the laser resonator shown in FIG. 1 is changed as shown in FIG. 21 wherein the pulse voltage shown in FIG. 21 is periodically applied to the electrooptical modulator 7 at a frequency of 1 kHz. This condition is the same as that employed to obtain the Q-switched pulse shown in FIG. 37 using the conventional laser apparatus. In response, two Q-switched steep pulses are obtained at intervals of about 1 $\mu$s. Each of two Q-switched pulses has a peak power of 660 kW and a full-width at half maximum of 60 ns, and thus a laser energy of about 63 mJ is output per cycle.

Figure 23:
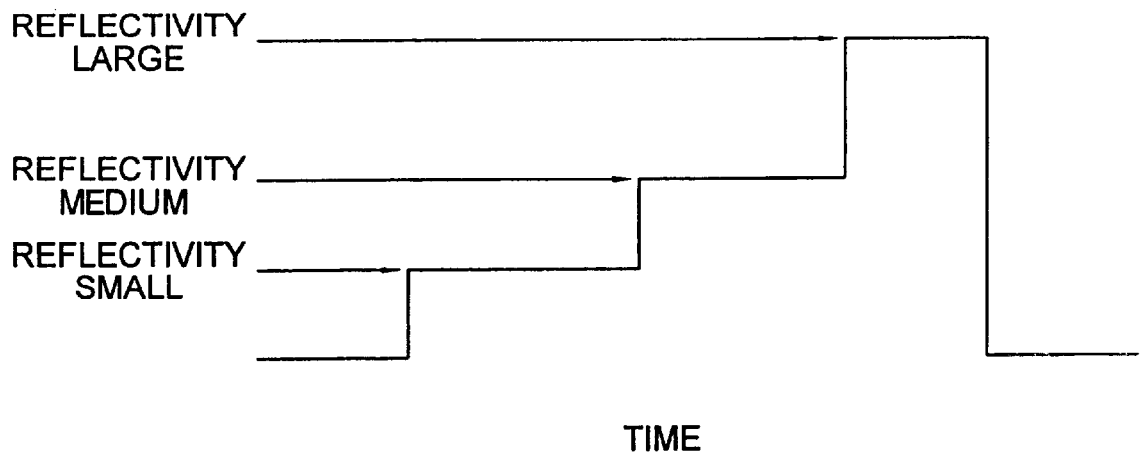
FIG. 23 illustrates the change, over time, in the reflectivity of the laser resonator of the laser apparatus according to the fifth embodiment of the invention.

In this fifth embodiment, as described above, the reflectivity of the laser resonator is changed over time in the two-level step fashion during each cycle as shown in FIG. 21. Alternatively, the reflectivity may be changed over time in a three-level step fashion during each cycle as shown in FIG. 23. In this case, the laser beam oscillation characteristic will be as shown in FIG. 24.

FIG. 24 illustrates the laser oscillation characteristic in terms of the intensity as a function of time for each cycle. As can be seen from FIG. 24, three Q-switched steep laser pulses are obtained at time intervals of about 1 μs. Each of these three Q-switched laser pulses has a peak power of 420 kW and a full-width at half maximum of 60 ns, and thus a laser energy of about 74 mJ is output per cycle.

Figure 25A:
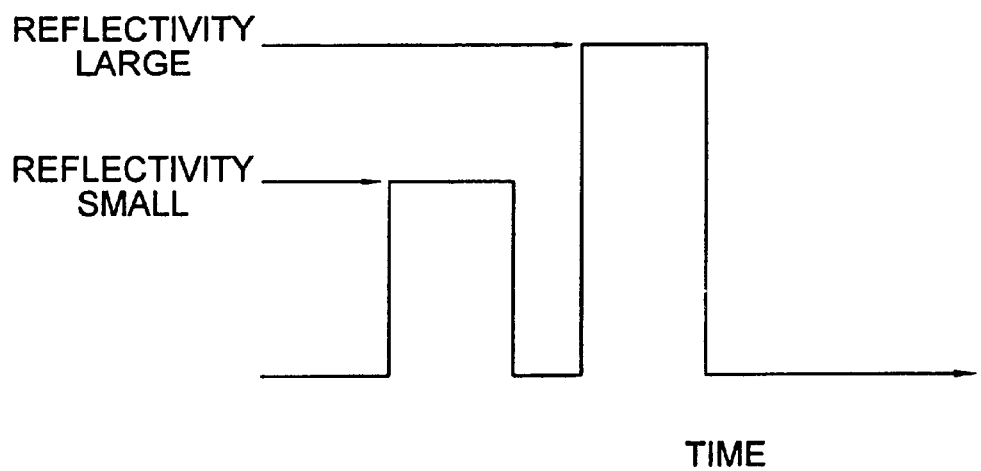
FIG. 25 illustrates the change, over time, in the reflectivity of the laser resonator of the laser apparatus according to the fifth embodiment of the invention.
Figure 25B:
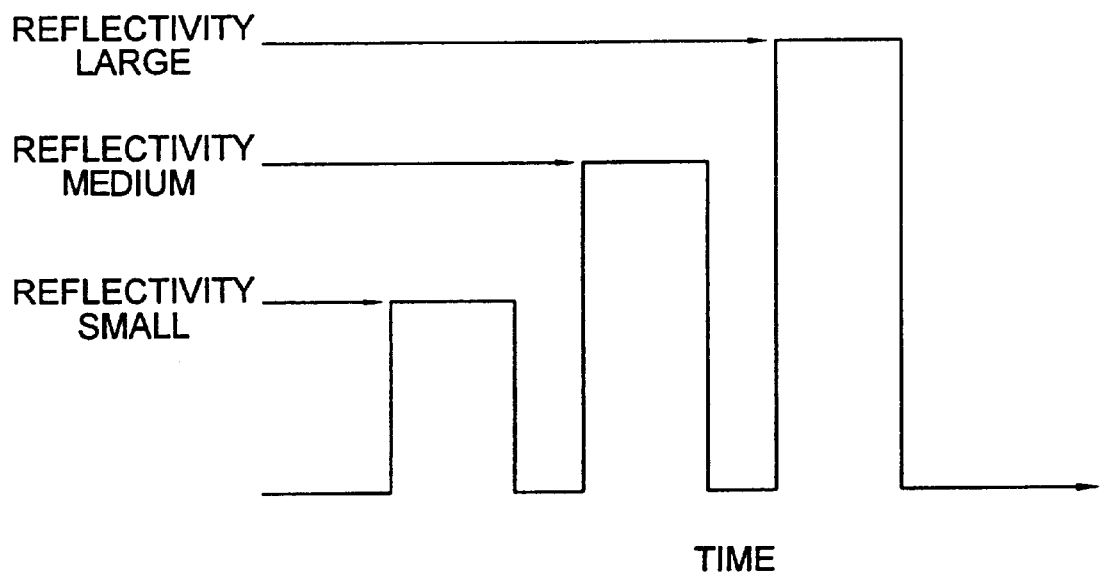
Figure 26A:
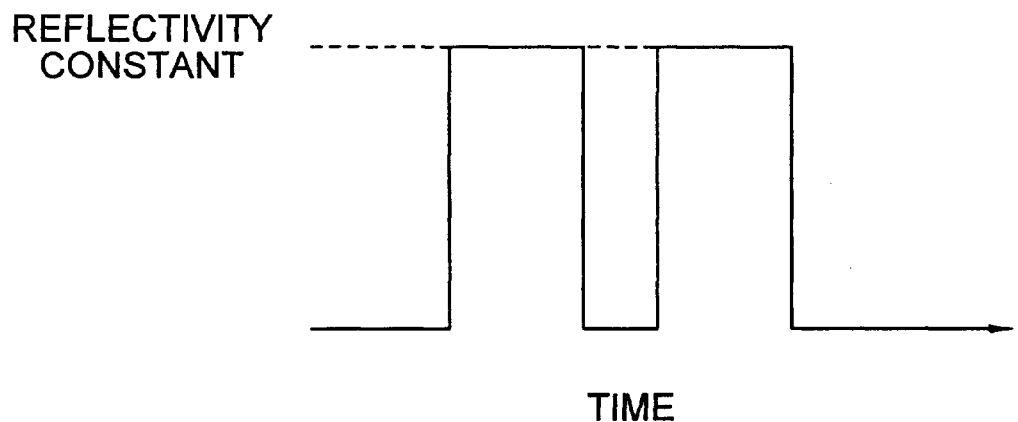
FIG. 26 illustrates the change, over time, in the reflectivity of the laser resonator of the laser apparatus according to the fifth embodiment of the invention.
Figure 26B:
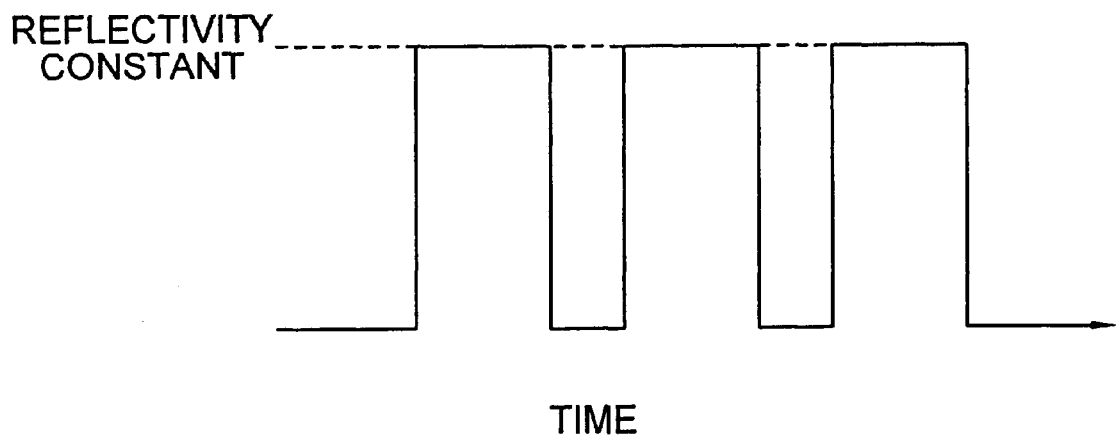
Figure 27A:
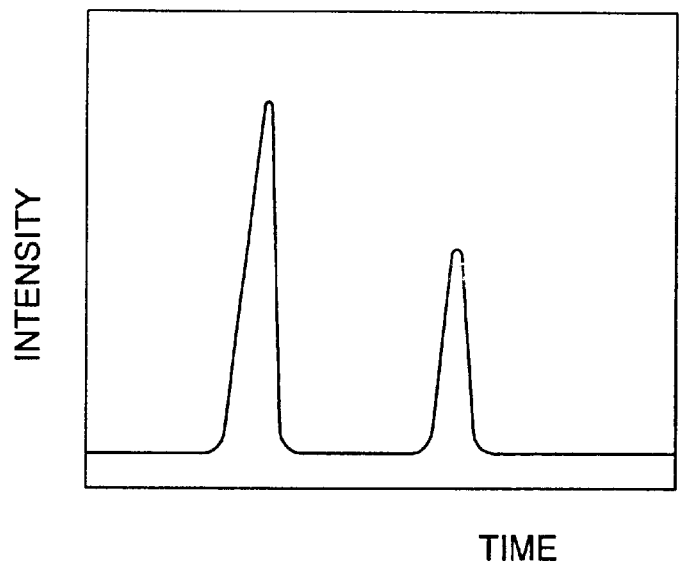
FIG. 27 illustrates the Q-switched pulse characteristic of the laser apparatus according to the fifth embodiment of the invention.
Figure 27B:
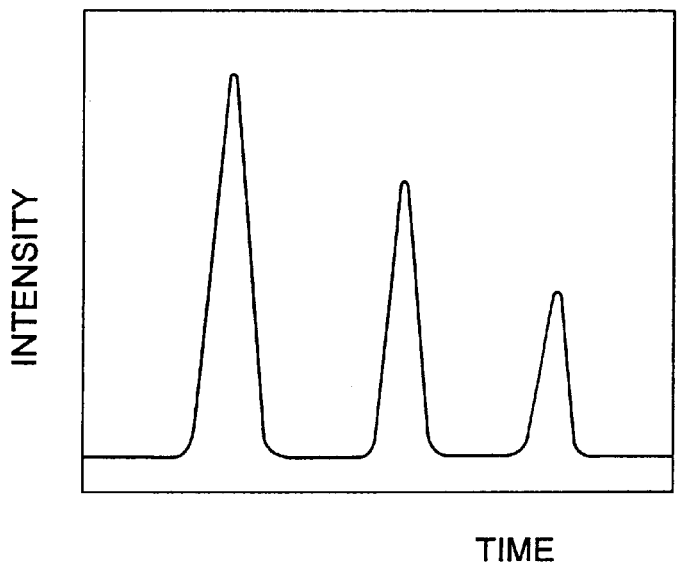

Instead of varying the reflectivity of the laser resonator in a two- or three-level step fashion during each cycle as shown FIG. 21 or 23, similar effects can also be obtained by applying successive pulses which are different in voltage from each other as shown in FIG. 25. If successive pulses which are equal in voltage as shown in FIG. 26 are applied, then a plurality of Q-switched steep laser pulses having different peak powers are obtained as shown in FIG. 27. More specifically, if two successive pulses having the same voltage are applied as shown in FIG. 26A, then laser pulses are obtained as shown in FIG. 27A. Similarly, if three successive pulses having the same voltage are applied as shown in FIG. 26B, then laser pulses are obtained as shown in FIG. 27B.

FIG. 28 illustrates the comparison between the Q-switched laser energy per cycle obtained according to the present invention and that obtained by the convention Q-switched technique.

It can be seen from FIG. 28 that by employing the Q-switched pulse generation technique according to the present invention, it is possible to obtain a laser energy 1.6 times higher than that obtained by the conventional technique. Furthermore, as can be seen from comparison between FIGS. 22 and 24 and FIG. 37, it is possible to suppress the peak intensity to about ¼ of the value obtained by the conventional technique.

As described above, if a pulse voltage varying as a periodic function of time during each cycle is applied from the variable pulse generator 14 to the electrooptical modulator 7, then the reflectivity of the laser resonator varies over time during each cycle. As a result, the output laser energy per cycle can be increased to a higher level than can be obtained by the conventional Q-switched technique. Furthermore, in the present invention, it is possible to suppress the peak intensity to a level which is suitable for the process of making a small hole which cannot be achieved by the high-power Q-switched laser according to the conventional technique.

Figure 29A:
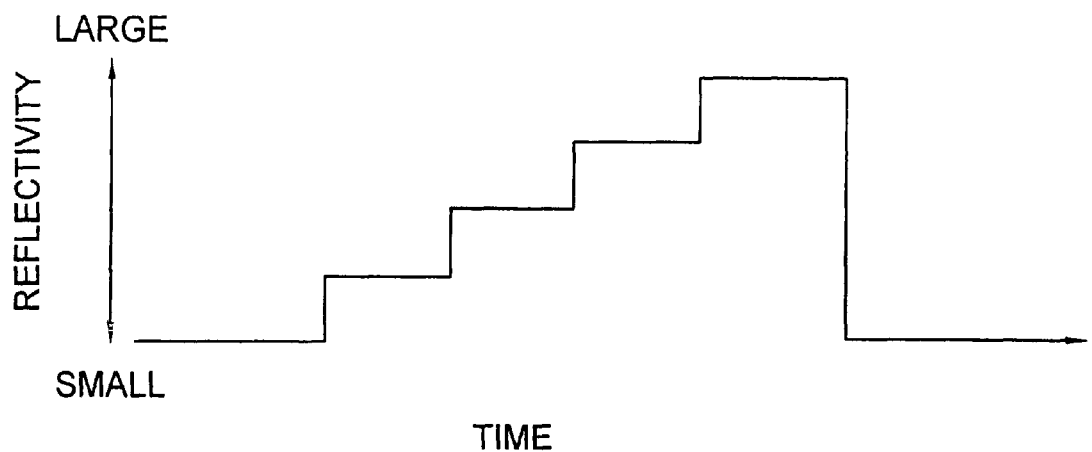
FIG. 29 illustrates the change, over time, in the reflectivity of the laser resonator of the laser apparatus according to the fifth embodiment of the invention.
Figure 29B:
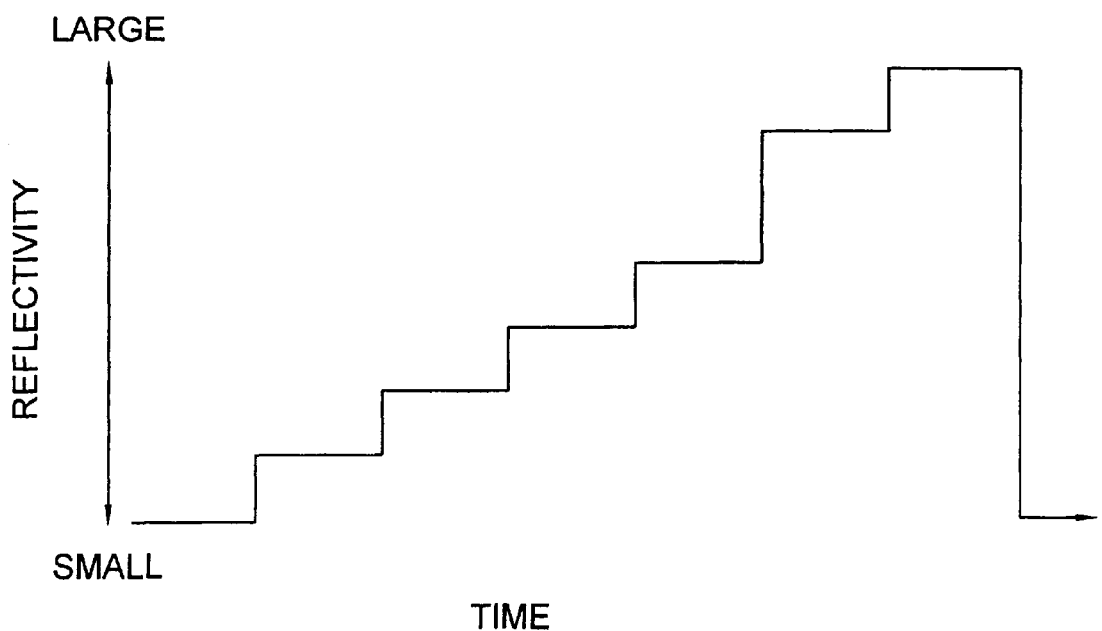
Figure 30A:
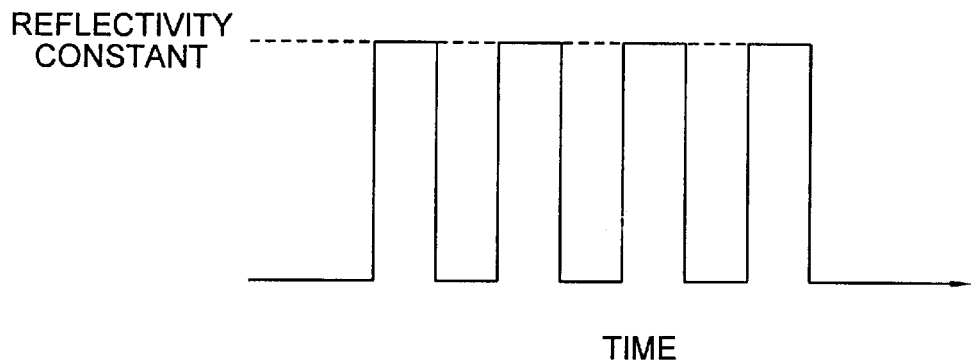
FIG. 30 illustrates the change, over time, in the reflectivity of the laser resonator of the laser apparatus according to the fifth embodiment of the invention.
Figure 30B:
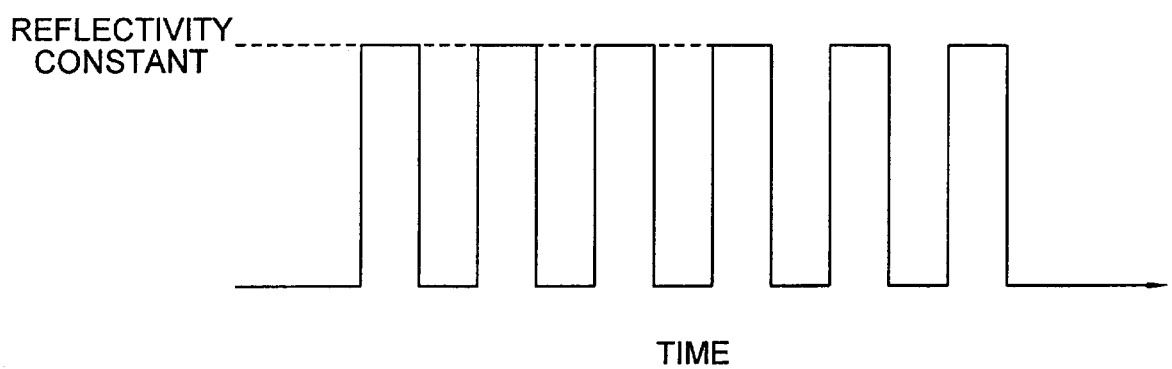

Although in the firth embodiment described above, the reflectivity of the laser resonator is varied in a two- or three-level step fashion during each cycle, similar effects may also be obtained by varying the reflectivity as a multi-level step function with four or more levels as shown in FIGS. 29 and 30. That is, what is essential here is to vary the reflectivity over time.

Sixth Embodiment

Figure 31:
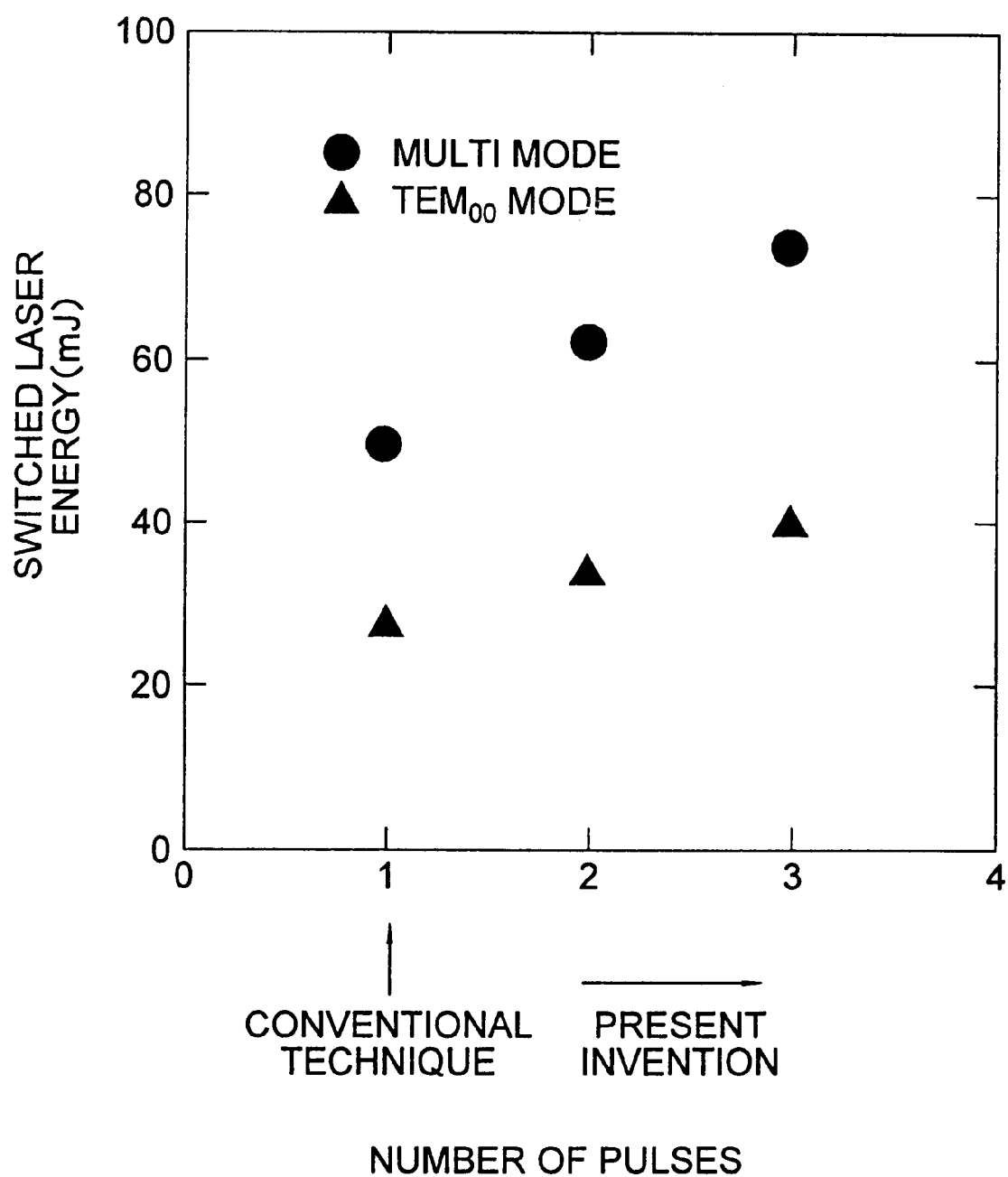
FIG. 31 illustrates the output characteristic of a laser apparatus according to a sixth embodiment of the invention.

FIG. 31 illustrates the output characteristic of a laser apparatus according to a sixth embodiment of the present invention.

Although the functions of openings 17a, 17b, and 17c disposed in the laser resonators are not described in the first embodiment, the laser oscillation mode associated with the laser resonators can be set to a $TEM_{00}$ mode or a transverse mode by adjusting for example the diameter of the openings 17a, 17b, and 17c thereby making it possible to make a high-precision hole using the laser apparatus according to the invention.

FIG. 31 illustrates the Q-switched laser energy per cycle obtained when the diameters of the openings 17a, 17b, and 17c are adjusted so that a laser beam is generated in the $TEM_{00}$ mode wherein energies obtained when laser beams are generated in the $TEM_{00}$ mode using the conventional Q-switched technique are also shown for the purpose of comparison.

As can be seen from FIG. 31, by employing the Q-switched pulse generation technique according to the present invention, the laser energy in the $TEM_{00}$ mode can be increased to a level 1.6 times higher than can be obtained by the conventional technique.

Seventh Embodiment

Figure 32:
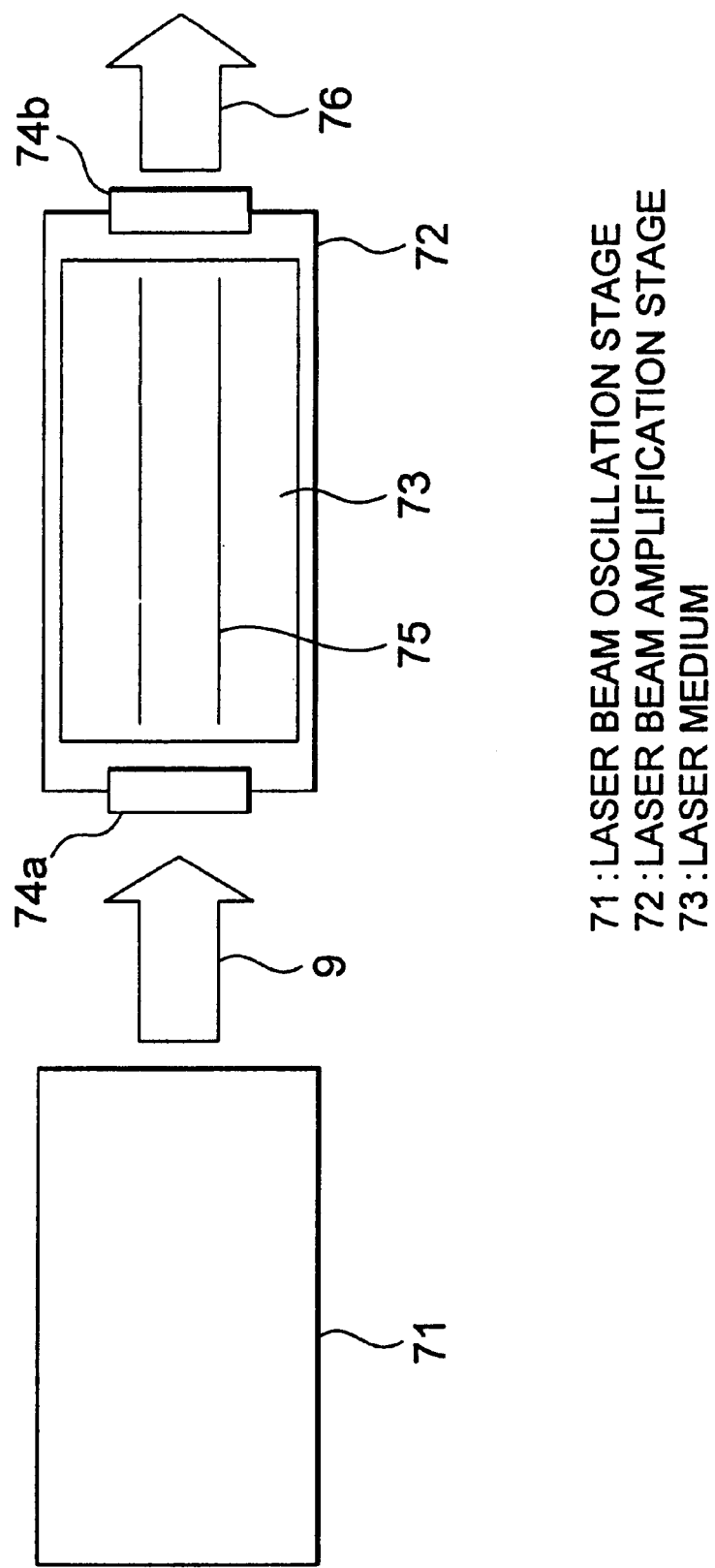
FIG. 32 is a schematic diagram illustrating the construction of a multistage amplification laser apparatus according to a seventh embodiment of the invention.

FIG. 32 is a schematic diagram illustrating the construction of a multistage amplification laser apparatus according to a seventh embodiment of the invention.

In this multistage amplification laser apparatus according to the seventh embodiment, a laser apparatus serving as a laser beam oscilation stage according to the invention is combined with a laser beam amplification stage as shown in FIG. 32.

In FIG. 32, the multistage amplification laser apparatus includes a laser beam oscilation stage 71, a laser beam amplification stage 72, a laser medium 73, and transmission windows 74a and 74b.

In the case of a $CO_2$ laser, the laser medium is a gas medium which is excited for example by electric discharging. In FIG. 32, reference numeral 75 denotes a laser beam present in the laser beam amplification stage and reference numeral 76 denotes a laser beam output to the outside of the laser beam amplification stage.

The operation of this embodiment will be described below.

The operation of the laser beam osculation stage 71 is similar to that of the laser apparatus described in the first embodiment. A laser beam 9 is output to the outside of the laser resonator and input into the laser beam amplification stage 72 through the transmission window 74a. In the inside of the laser beam amplification stage 72, the laser beam 75 is amplified by the laser medium in the amplification stage and the amplified laser beam is output as the high-power laser beam 76 through the transmission window 74b.

Eighth Embodiment

In the seventh embodiment described above, one laser beam amplification stage 72 is employed. Instead, a plurality of laser beam amplification stages 72 may also be employed. In this case, a higher-power laser beam can be output from the final laser beam amplification stage.

Although in the first to eighth embodiments, the invention is applied to the $CO_2$ laser, the invention may also be applied to other types of laser apparatus. For example, similar effects can be obtained by applying the invention to an excimer laser, a metal vapor laser, etc.

Furthermore, the laser medium is not limited to gas. The invention may also be applied to a solid laser using a solid laser medium.

Ninth Embodiment

Figure 33:
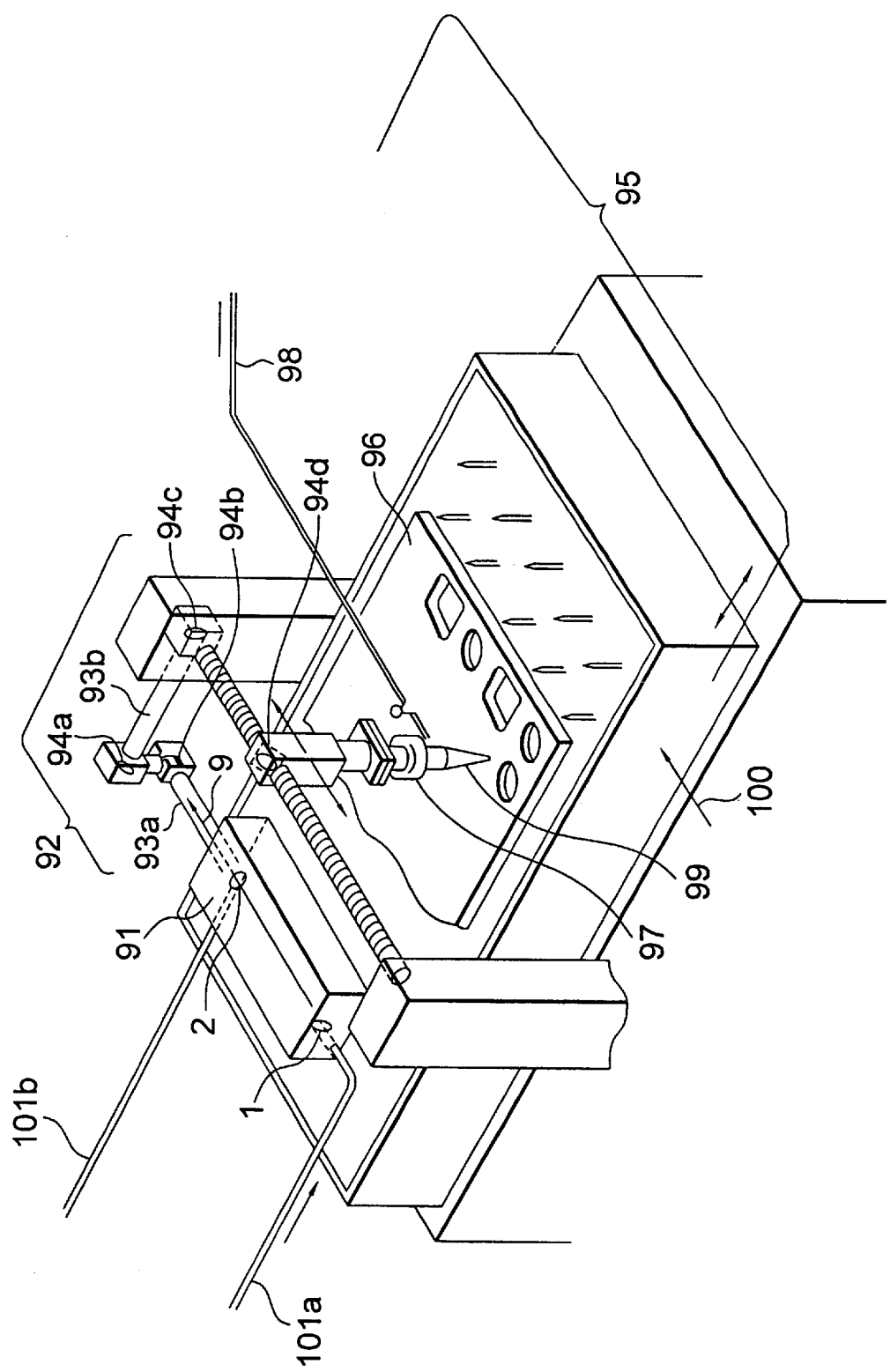
FIG. 33 is a schematic diagram illustrating an example of a laser machining apparatus including a laser apparatus according to a ninth embodiment of the invention.

FIG. 33 illustrates an example of a laser machining apparatus including a laser apparatus according to a ninth embodiment of the invention.

In FIG. 33, the laser machining apparatus includes a laser apparatus serving as a laser generator 91 according to the present invention, a beam transmission system 92, a machining head 95, a work table 100, and water pipes 101a and 101b.

The beam transmission system 92 includes a beam ducts 93a and 93b and bend mirrors 94a, 94b, 94c, and 94d. The beam transmission system 93 serves to transmit the laser beam 9 generated by the laser generator 91. The machining head 95 includes a machining lens 97 for focusing the laser beam 9 onto an object 96 to be machined and a nozzle 99 for blowing an assist gas supplied through the assist gas pipe 98 onto the object 96 to be machined. The work table 100 is a mechanism for moving the object 96 to be machined.

In this laser machining apparatus having the above-described structure, the laser apparatus according to any of first to eighth embodiments described above is employed and thus it is possible to generate a laser beam with a properly high peak intensity and with a high laser energy per cycle. This makes it possible to use the laser apparatus to make a high-precision hole.

As can be understood from the above description, the present invention has various advantages. That is, the laser apparatus according to an aspect of the present invention includes two laser resonators composed of one laser medium, and a polarization control element for switching the oscillating optical axes of the two laser resonators. This makes it possible to form the laser resonator in which laser oscillation occurs in the Q-switched mode and the laser resonator in which laser oscillation occurs in the non-Q-switched continuous or pulse mode in such a manner that they are independent of each other and thus the electrooptical modulator 7 is required to handle only the average power of the Q-switched pulse laser beam. Furthermore, since the same laser medium is shared by the two laser resonators, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam reflected by the polarization control element for forming a second laser resonator in cooperation with the first reflecting mirror, optical modulation means disposed between the polarization control element and the third reflecting mirror for modulating the phase of the laser beam depending on voltage applied thereto, and a first optical guiding element for converting the first linearly polarized component of the laser beam, which passed through the optical modulation means and the polarization control element successively, into a second linearly polarized component of the laser beam and then reflecting it toward the polarization control element. When no voltage is applied to the optical modulation means, the first linearly polarized component of the laser beam which passes through the polarization control element causes a laser oscillation in the first laser resonator and thus a laser beam is output from the second reflecting mirror, however, when a pulse voltage is applied to the optical modulation means, the second linearly polarized component of the laser beam reflected by the polarization control element passes through the optical modulation means and causes a Q-switched laser oscillation in the second laser resonator, and the first linearly polarized component which has passed through the polarization control element is reflected by the first optical guiding element, modulated into a second linearly polarized component and further reflected by the polarization control element whereby a Q-switched pulse laser beam is output from the second reflecting mirror. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus on the assumption that the electrooptical modulator of the second laser resonator is required to handle the average power of the Q-switched pulse laser beam. Furthermore, the same laser medium can be shared by the two laser resonators and the laser beam can be output through the same single output port. Therefore, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam transmitted through the polarization control element for forming a second laser resonator with the first reflecting mirror, optical modulation means disposed between the polarization control element and the third reflecting mirror for modulating the phase of the laser beam depending on a voltage applied thereto, and a second optical guiding element for converting the second linearly polarized component of the laser beam, which passed through the optical modulation means and reflected by the polarization control element respectively, into a first linearly polarized component of the laser beam and then reflecting it toward the polarization control element. When no voltage is applied to the optical modulation means, the second linearly polarized component of the laser beam reflected by the polarization control element causes a laser oscillation in the first laser resonator and thus a laser beam is output from the second reflecting mirror, however, when a pulse voltage is applied to the optical modulation means, the first linearly polarized component of the laser beam which passes through the polarization control element passes through the optical modulation means and causes a Q-switched laser oscillation in the second laser resonator, and the second linearly polarized component reflected by the polarization control element is reflected by the second optical guiding element, modulated into a first linearly polarized component and further passes through the polarization control element whereby a Q-switched pulse laser beam is output from the second reflecting mirror. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus on the assumption that the electrooptical modulator of the second laser resonator is required to handle the average power of the Q-switched pulse laser beam. Furthermore, the same laser medium can be shared by the two laser resonators and the laser beam can be output through the same single output port. Therefore, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a partial reflection mirror disposed on the optical axis of the laser beam reflected by the polarization control element for forming a second laser resonator in cooperation with the first reflecting mirror, and optical modulation means disposed between the polarization control element and the partial reflection mirror for modulating the phase of the laser beam depending on a voltage applied thereto, wherein when no voltage is applied to the optical modulation means, the first linearly polarized component of the laser beam which passes through the polarization control element causes a laser oscillation in the first laser resonator and thus a laser beam is output from the second reflecting mirror, however, when a pulse voltage is applied to the optical modulation means, the second linearly polarized component of the laser beam reflected by the polarization control element passes through the optical modulation means and causes a Q-switched laser oscillation in the second laser resonator whereby a Q-switched pulse laser beam is output through the partial reflection mirror. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus under the assumption that the electrooptical modulator of the second laser resonator is required to handle the average power of the Q-switched pulse laser beam. Furthermore, since the same laser medium is shared by the two laser resonators, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam reflected by the polarization control element for forming a second laser resonator in cooperation with the first reflecting mirror, and optical modulation means disposed between the polarization control element and the third reflecting mirror for modulating the phase of the laser beam depending on a voltage applied thereto. When no voltage is applied to the optical modulation means, the first linearly polarized component of the laser beam which passes through the polarization control element causes a laser oscillation in the first laser resonator and thus a laser beam is output from the second reflecting mirror, however when a pulse voltage is applied to the optical modulation means, the second linearly polarized component of the laser beam reflected by the polarization control element passes through the optical modulation means and causes a Q-switched laser oscillation in the second laser resonator, and the first linearly polarized component passes through the polarization control element whereby a Q-switched pulse laser beam is output through the polarization control element. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus on the assumption that the electrooptical modulator of the second laser resonator is required to handle the average power of the Q-switched pulse laser beam. Furthermore, since the same laser medium is shared by the two laser resonators, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a partial reflection mirror disposed on the optical axis of the laser beam transmitted through the polarization control element for forming a second laser resonator in cooperation with the first reflecting mirror, and optical modulation means disposed between the polarization control element and the partial reflection mirror for modulating the phase of the laser beam depending on a voltage applied thereto. When no voltage is applied to the optical modulation means, the second linearly polarized component of the laser beam reflected by the polarization control element causes a laser oscillation in the first laser resonator and thus a laser beam is output from the second reflecting mirror, however, when a pulse voltage is applied to the optical modulation means, the first linearly polarized component of the laser beam transmitted through the polarization control element passes through the optical modulation means and causes a Q-switched laser oscillation in the second laser resonator whereby a Q-switched pulse laser beam is output through the partial reflection mirror. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus on the assumption that the electrooptical modulator of the second laser resonator is required to handle the average power of the Q-switched pulse laser beam. Furthermore, since the same laser medium is shared by the two laser resonators, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise a first reflecting mirror and a second reflecting mirror disposed so that the one laser medium is located between the first and second reflecting mirrors so as to form a first laser resonator, a polarization control element disposed between the first and second reflecting mirrors for transmitting a first linearly polarized component of a laser beam and reflecting a second linearly polarized component of the laser beam, a third reflecting mirror disposed on the optical axis of the laser beam transmitted through the polarization control element for forming a second laser resonator in cooperation with the first reflecting mirror, and optical modulation means disposed between the polarization control element and the third reflecting mirror for modulating the phase of the laser beam depending on a voltage applied thereto. When no voltage is applied to the optical modulation means, the second linearly polarized component of the laser beam which is reflected by the polarization control element causes a laser oscillation in the first laser resonator and thus a laser beam is output from the second reflecting mirror, however, when a pulse voltage is applied to the optical modulation means, the first linearly polarized component of the laser beam transmitted through the polarization control element passes through the optical modulation means and causes a Q-switched laser oscillation in the second laser resonator, and the second linearly polarized component is reflected by the polarization control element whereby a Q-switched pulse laser beam is output through the polarization control element. This makes it possible to form the second laser resonator in which laser oscillation occurs in the Q-switched mode and the first laser resonator in which laser oscillation occurs in the non-Q-switched continuous or pulse mode in such a manner that they are independent of each other and thus it is possible to design the laser apparatus on the assumption that the electrooptical modulator of the second laser resonator is required to handle the average power of the Q-switched pulse laser beam. Furthermore, since the same laser medium is shared by the two laser resonators, it is possible to realize a laser apparatus with a very small size. This allows great reductions in the installation space and in cost of the laser apparatus. If this laser apparatus is used in a laser machining apparatus, it is possible to arbitrarily switch the operation mode as required between the Q-switched mode and the non-Q-switched continuous or pulse mode thereby achieving very high efficiency in the laser machining. The switching between the Q-switched mode and the non-Q-switched continuous or pulse mode in the laser machining process cannot be achieved by the conventional techniques and has been first achieved by the present invention.

The laser apparatus may further comprise an optical element for outputting two types of laser beams through the same single output port, wherein two types of laser beams include a laser beam which is output from the second reflecting mirror when no voltage is applied to the optical modulation means and a laser beam which is output through the partial reflection mirror when the pulse voltage is applied to the optical modulation means. If this laser apparatus is used in a laser machining apparatus, it is possible to perform a laser machining operation in a much more efficient manner than can be achieved with the conventional apparatus.

Alternatively, the laser apparatus may further comprise an optical element for outputting two types of laser beams through the same single output port, wherein two types of laser beams include a laser beam which is output from the second reflecting mirror when no voltage is applied to the optical modulation means and a laser beam which is output through the polarization control element when the pulse voltage is applied to the optical modulation means. If this laser apparatus is used in a laser machining apparatus, it is possible to perform a laser machining operation in a much more efficient manner than can be achieved with the conventional apparatus.

Preferably, the first reflecting mirror is realized with a total reflection mirror and the second reflecting mirror is realized with a partial reflection mirror thereby realizing the first laser resonator having a simple structure and a high efficiency, whereby it becomes possible to efficiently output a laser beam in a continuous or pulse mode.

Preferably, the optical modulation means is made up of an electrooptical modulator and a wave plate. The usage of the wave plate allows a reduction in the voltage applied to the electrooptical modulator. The reduction in the voltage applied to the electrooptical modulator results in an increase in the life-time of the electrooptical modulator. Furthermore, the reduction in the voltage applied to the electrooptical modulator alleviates the requirement for the variable pulse generator in terms of the voltage and thus it becomes possible to greatly reduce the cost of the laser apparatus.

The optical modulation means may also be made up of an electrooptical modulator. In this case, it becomes possible to realize a high-reliability laser apparatus with a simple structure.

Preferably, the above-described pulse voltage applied to the optical modulation means varies according to a periodic function of time wherein the voltage varies at least twice or more times during each cycle. This makes it possible to output a laser beam having a lower peak intensity than that obtained by the conventional Q-switched laser apparatus. Furthermore, it becomes possible to increase the laser energy per pulse to a level 1.6 times higher than that achieved by the conventional Q-switched laser apparatus. It also becomes possible to realize a laser apparatus with a very small size, which allows great reductions in the installation space and in cost of the laser apparatus.

The pulse voltage applied to the optical modulation means may also vary according to a multi-Level step function which is periodic with respect to time. This makes it possible to output a laser beam having a lower peak intensity than can be obtained by the conventional Q-switched laser apparatus. Furthermore, it becomes possible to increase the laser energy per pulse to a level 1.6 times higher than can be achieved by the conventional Q-switched laser apparatus. It also becomes possible to realize a laser apparatus with a very small size, which allows great reductions in the installation space and in cost of the laser apparatus.

Preferably, an opening for selecting the transverse mode of the laser beam is provided in each of the first laser resonator and second laser resonator. By adjusting the diameter of the opening, it is possible to select the transverse mode of the laser oscillation in the laser resonator. Furthermore, the laser machining apparatus using the laser apparatus according to the invention can operate continuously for a long time while maintaining the high beam quality. This allows reductions in the production cost and the power consumption.

The multistage amplification laser apparatus includes a laser apparatus according to any aspect of the invention and serving as a laser beam oscilation stage, and a laser beam amplification stage for amplifying a laser beam supplied from the laser beam oscilation stage. The laser beam input into the laser beam amplification stage is amplified by the laser medium of the amplification stage and output as a Q-switched high-power laser beam. The high quality of the laser beam makes it possible for the laser medium of the amplification stage to output energy in a very efficient manner. Furthermore, the high quality of the laser beam makes it possible to well focus the beam, which can be advantageously used in the laser machining process.

In the multistage amplification laser apparatus, there may be provided a plurality of laser beam amplification stages so that the laser beam input into the laser beam amplification stages is amplified by the laser medium of each amplification stage and finally output as a Q-switched high-power laser beam. The high quality of the laser beam makes it possible for the laser medium of the amplification stage to output energy in a very efficient manner. Furthermore, the high quality of the laser beam makes it possible to well focus the beam, which can be advantageously used for example in the laser machining process.

Furthermore, a laser machining apparatus for machining an object by irradiating the object with a laser beam can be realized using a laser apparatus according to any aspect of the invention. This makes it possible to machine an object with a well-focused laser beam in a short time. It also becomes possible to realize a laser apparatus with a very small size, which allows great reductions in the installation space and in cost of the laser apparatus.

What is claimed is:

1. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a third reflecting mirror disposed on an optical axis of the laser beam reflected by said polarization control element and cooperating with said first reflecting mirror to form said second laser resonator;

optical modulation means disposed between said polarization control element and said third reflecting mirror for modulating phase of the laser beam depending on a voltage applied thereto; and a first optical guiding element for converting the first linearly polarized component of the laser beam, which passed through said optical modulation means and said polarization control element successively, into a second linearly polarized component of the laser beam and reflecting the second linearly polarized component toward said polarization control element, wherein, when no voltage is applied to said optical modulation means, the first linearly polarized component of the laser beam which passes through said polarization control element causes laser oscillation in said first laser resonator so that a laser beam is output from said second reflecting mirror, and, when a pulsed voltage is applied to said optical modulation means, the second linearly polarized component of the laser beam reflected by said polarization control element passes through said optical modulation means and causes a Q-switched laser oscillation in said second laser resonator, and the first linearly polarized component which has passed through said polarization control element is reflected by said first optical guiding element, modulated into a second linearly polarized component, and reflected by said polarization control element whereby a Q-switched pulse laser beam is output from said second reflecting mirror.

2. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a third reflecting mirror disposed on an optical axis of the laser beam transmitted through said polarization control element and cooperating with said first reflecting mirror to form said second laser resonator;

optical modulation means disposed between said polarization control element and said third reflecting mirror for modulating phase of the laser beam depending on a voltage applied thereto; and a first optical guiding element for converting the second linearly polarized component of the laser beam, which passed through said optical modulation means and was reflected by said polarization control element, into a first linearly polarized component of the laser beam and reflecting the first linearly polarized component toward said polarization control element, wherein, when no voltage is applied to said optical modulation means, the second linearly polarized component of the laser beam which passes through said polarization control element causes laser oscillation in said first laser resonator so that a laser beam is output from said second reflecting mirror, and, when a pulsed voltage is applied to said optical modulation means, the first linearly polarized component of the laser beam which passes through said optical modulation means and causes a Q-switched laser oscillation in said second laser resonator, and the second linearly polarized component reflected by said polarization control element is reflected by said second optical guiding element, modulated into a first linearly polarized component, and passes through said polarization control element whereby a Q-switched pulse laser beam is output from said second reflecting mirror.

3. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a partial reflection mirror disposed on an optical axis of the laser beam reflected by said polarization control element and cooperating with said first reflecting mirror to form said second laser resonator; and optical modulation means disposed between said polarization control element and said partial reflection mirror for modulating phase of the laser beam depending on a voltage applied thereto, wherein, when no voltage is applied to said optical modulation means, the first linearly polarized component of the laser beam which passes through said polarization control element causes laser oscillation in said first laser resonator so that a laser beam is output from said second reflecting mirror, and, when a pulsed voltage is applied to said optical modulation means, the second linearly polarized component of the laser beam reflected by said polarization control element passes through said optical modulation means and causes a Q-switched laser oscillation in said second laser resonator whereby a Q-switched pulse laser beam is output through said partial reflection mirror.

4. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a third reflecting mirror disposed on an optical axis of the laser beam reflected by said polarization control element and cooperating with said first reflecting mirror to form said second laser resonator; and optical modulation means disposed between said polarization control element and said third reflecting mirror for modulating phase of the laser beam depending on a voltage applied thereto, wherein, when no voltage is applied to said optical modulation means, the first linearly polarized component of the laser beam which passes through said polarization control element causes laser oscillation in said first laser resonator so that a laser beam is output from said second reflecting mirror, and, when a pulsed voltage is applied to said optical modulation means, the second linearly polarized component of the laser beam reflected by said polarization control element passes through said optical modulation means and causes a Q-switched laser oscillation in said second laser resonator, and the first linearly polarized component passe, through said polarization control element whereby a Q-switched pulse laser beam is output through said polarization control element.

5. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a partial reflection mirror disposed on an optical axis of the laser beam transmitted through said polarization control element and cooperating with said first reflecting mirror to form said second laser resonator;

optical modulation means disposed between said polarization control element and said partial reflection mirror for modulating phase of the laser beam depending on a voltage applied thereto, wherein, when no voltage is applied to said optical modulation means, the second linearly polarized component of the laser beam which passes through said polarization control element causes laser oscillation in said first laser resonator so that a laser beam is output from said second reflecting mirror, and, when a pulsed voltage is applied to said optical modulation means, the first linearly polarized component of the laser beam transmitted through said polarization control element passes through said optical modulation means and causes a Q-switched laser oscillation in said second laser resonator whereby a Q-switched pulse laser beam is output through said partial reflection mirror.

6. A laser apparatus comprising:

first and second laser resonators having a single laser medium and respective first and second optical axes;

polarization control means for switching oscillation between the first and second optical axes of said first and second resonators;

a first reflecting mirror and a second reflecting mirror disposed so that said one laser medium is located between said first and second reflecting mirrors to form said first laser resonator;

a polarization control element disposed between said first and second reflecting mirrors for transmitting a first linearly polarized component of a laser beam and reflecting a second linearly polarized component of the laser beam;

a third reflecting mirror disposed on an optical axis of the laser beam transmitted through said polarization control element and cooperating with said first reflecting mirror to form said second laser resonator; and optical modulation means disposed between said polarization control element and said third reflecting mirror for modulating phase of the laser beam depending on a voltage applied thereto, wherein, when no voltage is applied to said optical modulation means, the second linearly polarized component of the laser beam reflected by said polarization control element causes laser oscillation in said first laser resonator so that a laser beam is output from said second reflecting mirror, and, when a pulsed voltage is applied to said optical modulation means, the first linearly polarized component of the laser beam transmitted through said optical modulation means and caluses a Q-switched laser oscillation in said second laser resonator, and the second linearly polarized component reflected by said polarization control element whereby a Q-switched pulse laser beam is output through said polarization control element.

7. The laser apparatus according to claim 3, further comprising an optical element for outputting two types of laser beams through a single output port, wherein two types of laser beams include a laser beam which is output from said second reflecting mirror when no voltage is applied to said optical modulation means and a laser beam which is output through said partial reflection mirror when the pulse voltage is applied to said optical modulation means.

8. The laser apparatus according to claim 3, further comprising an optical element for outputting two types of laser beams through a single output port, wherein the two types of laser beams include a laser beam output from said second reflecting mirror when no voltage is applied to said optical modulation means and a laser beam output through said polarization control element when the pulsed voltage is applied to said optical modulation means.

9. The laser apparatus according to claim 1, wherein said first reflecting mirror is a total reflection mirror and said second reflecting mirror is a partial reflection mirror.

10. The laser apparatus according to claim 1, wherein said optical modulation means comprises an electrooptical modulator and a wave plate.

11. The laser apparatus according to claim 1, wherein said optical modulation means comprises an electrooptical modulator.

12. The laser apparatus according to claim 1, wherein the pulsed voltage applied to said optical modulation means varies according to a periodic function of time and at least twice during each cycle.

13. The laser apparatus according to claim 1, the pulsed voltage applied to said optical modulation means varies according to a multi-level step function which is periodic with respect to time.

14. The laser apparatus according to claim 1, including an opening for selecting the transverse mode of the laser beam located in said first laser resonator and second laser resonator.

* * * * *